US009817533B2

(12) United States Patent
Bulea et al.

(10) Patent No.: US 9,817,533 B2
(45) Date of Patent: Nov. 14, 2017

(54) SINGLE LAYER CAPACITIVE IMAGING SENSORS

(71) Applicant: SYNAPTICS INCORPORATED, San Jose, CA (US)

(72) Inventors: Mihai Bulea, Santa Clara, CA (US); Derek Solven, San Jose, CA (US); Joseph Kurth Reynolds, Alviso, CA (US); David Hoch, Los Gatos, CA (US); Tracy Scott Dattalo, Santa Clara, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/918,496

(22) Filed: Oct. 20, 2015

(65) Prior Publication Data

US 2016/0041654 A1   Feb. 11, 2016

Related U.S. Application Data

(63) Continuation of application No. 13/740,121, filed on Jan. 11, 2013, now Pat. No. 9,182,861.
(Continued)

(51) Int. Cl.
*G06F 3/044*   (2006.01)
*G06F 3/041*   (2006.01)

(52) U.S. Cl.
CPC ............. *G06F 3/044* (2013.01); *G06F 3/041* (2013.01); *G06F 2203/04112* (2013.01)

(58) Field of Classification Search
CPC ........ G06F 3/041; G06F 3/0412; G06F 3/047; G06F 3/044
See application file for complete search history.

(56) References Cited

U.S. PATENT DOCUMENTS 4,087,625 A    5/1978  Dym et al.
4,233,522 A   11/1980  Grummer et al.
(Continued)

FOREIGN PATENT DOCUMENTS

CN    2436978 Y    6/2001
CN    1490713 A    4/2004
(Continued)

OTHER PUBLICATIONS

Chinese Patent Applicaiton 201380013665.X , English translation Office Action and Search Report dated May 4, 2016, Consists of 12 pages.
(Continued)

*Primary Examiner* — Kevin M Nguyen
(74) *Attorney, Agent, or Firm* — Patterson + Sheridan, LLP

(57) ABSTRACT

Embodiments of the invention generally provide an input device that includes a plurality of sensing elements that are interconnected in desired way to acquire positional information of an input object, so that the acquired positional information can be used by other system components to control a display or other useful system components. One or more of the embodiments described herein, utilizes one or more of the techniques and sensor electrode array configuration disclosed herein to reduce or minimize the number of traces and/or electrodes required to sense the position of an input object within a sensing region of the input device.

16 Claims, 19 Drawing Sheets

Related U.S. Application Data

(60) Provisional application No. 61/586,076, filed on Jan. 12, 2012.

(56) References Cited

U.S. PATENT DOCUMENTS

| | | | |
|---|---|---|---|
| 4,237,421 A | 12/1980 | Waldron | |
| 4,264,903 A | 4/1981 | Bigelow | |
| 4,293,987 A | 10/1981 | Gottbreht et al. | |
| 4,484,026 A | 11/1984 | Thornburg | |
| 4,492,958 A | 1/1985 | Minami | |
| 4,550,221 A | 10/1985 | Mabusth | |
| 4,659,874 A | 4/1987 | Landmeier | |
| 4,667,259 A | 5/1987 | Uchida et al. | |
| 4,677,259 A | 6/1987 | Abe | |
| 4,705,919 A | 11/1987 | Dhawan | |
| 4,771,138 A | 9/1988 | Dhawan | |
| 4,878,013 A | 10/1989 | Andermo | |
| 4,954,823 A | 9/1990 | Binstead | |
| 4,999,462 A | 3/1991 | Purcell | |
| 5,053,715 A | 10/1991 | Andermo | |
| 5,062,916 A | 11/1991 | Aufderheide et al. | |
| 5,239,307 A | 8/1993 | Andermo | |
| 5,341,233 A | 8/1994 | Tomoike et al. | |
| 5,459,463 A | 10/1995 | Gruaz et al. | |
| 5,463,388 A | 10/1995 | Boie et al. | |
| 5,650,597 A | 7/1997 | Redmayne | |
| 5,657,012 A | 8/1997 | Tait | |
| 5,777,596 A | 7/1998 | Herbert | |
| 5,841,078 A | 11/1998 | Miller et al. | |
| 5,869,790 A | 2/1999 | Shigetaka et al. | |
| 6,188,391 B1 | 2/2001 | Seely et al. | |
| 6,222,522 B1 | 4/2001 | Mathews et al. | |
| 6,256,022 B1 | 7/2001 | Manaresi et al. | |
| 6,281,888 B1 | 8/2001 | Hoffman et al. | |
| 6,288,707 B1 | 9/2001 | Philipp | |
| 6,297,811 B1 | 10/2001 | Kent et al. | |
| 6,307,751 B1 | 10/2001 | Bodony et al. | |
| 6,320,394 B1 | 11/2001 | Tartagni | |
| 6,362,633 B1 | 3/2002 | Tartagni | |
| 6,380,930 B1 | 4/2002 | Van Ruymbeke | |
| 6,452,514 B1 | 9/2002 | Philipp | |
| 6,459,044 B2 | 10/2002 | Watanabe et al. | |
| 6,486,862 B1 | 11/2002 | Jacobsen et al. | |
| 6,512,381 B2 | 1/2003 | Kramer | |
| 6,535,200 B2 | 3/2003 | Philipp | |
| 6,583,632 B2 | 6/2003 | Von Basse et al. | |
| 6,653,736 B2 | 11/2003 | Kishimoto et al. | |
| 6,731,120 B2 | 5/2004 | Tartagni | |
| 6,771,327 B2 | 8/2004 | Sekiguchi | |
| 6,825,833 B2 | 11/2004 | Mulligan et al. | |
| 6,879,930 B2 | 4/2005 | Sinclair et al. | |
| 6,910,634 B1 | 6/2005 | Inose et al. | |
| 6,937,031 B2 | 8/2005 | Yoshioka et al. | |
| 6,998,855 B2 | 2/2006 | Tartagni | |
| 7,129,935 B2 | 10/2006 | Mackey | |
| 7,158,125 B2 | 1/2007 | Sinclair et al. | |
| 7,218,314 B2 | 5/2007 | Itoh | |
| 7,306,144 B2 | 12/2007 | Moore | |
| 7,327,352 B2 | 2/2008 | Keefer et al. | |
| 7,339,579 B2 | 3/2008 | Richter et al. | |
| 7,348,967 B2 | 3/2008 | Zadesky et al. | |
| 7,382,139 B2 | 6/2008 | Mackey | |
| 7,388,571 B2 | 6/2008 | Lowles et al. | |
| 7,423,219 B2 | 9/2008 | Kawaguchi et al. | |
| 7,423,635 B2 | 9/2008 | Taylor et al. | |
| 7,439,962 B2 | 10/2008 | Reynolds et al. | |
| 7,455,529 B2 | 11/2008 | Fujii et al. | |
| 7,522,230 B2 | 4/2009 | Lee | |
| 7,548,073 B2 | 6/2009 | Mackey et al. | |
| 7,554,531 B2 | 6/2009 | Baker et al. | |
| 7,589,713 B2 | 9/2009 | Sato | |
| 7,663,607 B2 | 2/2010 | Hotelling et al. | |
| 7,724,243 B2 | 5/2010 | Geaghan | |
| 7,768,273 B1 | 8/2010 | Kalnitsky et al. | |
| 7,786,981 B2 | 8/2010 | Proctor | |
| 7,808,255 B2 | 10/2010 | Hristov et al. | |
| 7,812,825 B2 | 10/2010 | Sinclair et al. | |
| 7,821,274 B2 | 10/2010 | Philipp et al. | |
| 7,821,502 B2 | 10/2010 | Hristov | |
| 7,864,160 B2 | 1/2011 | Geaghan et al. | |
| 7,876,309 B2 | 1/2011 | XiaoPing | |
| 7,973,771 B2 | 7/2011 | Geaghan | |
| 7,977,953 B2 | 7/2011 | Lee | |
| 7,986,152 B2 | 7/2011 | Philipp et al. | |
| 8,040,326 B2 | 10/2011 | Hotelling et al. | |
| 8,059,015 B2 | 11/2011 | Hua et al. | |
| 8,125,463 B2 | 2/2012 | Hotelling et al. | |
| 8,243,027 B2 | 8/2012 | Hotelling et al. | |
| 8,259,078 B2 | 9/2012 | Hotelling et al. | |
| 8,278,571 B2 | 10/2012 | Orsley | |
| 8,319,747 B2 | 11/2012 | Hotelling et al. | |
| 8,502,796 B1* | 8/2013 | Yilmaz | G06F 3/044 178/18.06 |
| 2002/0077313 A1 | 6/2002 | Clayman | |
| 2003/0052867 A1 | 3/2003 | Shigetaka et al. | |
| 2003/0103043 A1 | 6/2003 | Mulligan et al. | |
| 2003/0234771 A1 | 12/2003 | Mulligan et al. | |
| 2004/0062012 A1 | 4/2004 | Murohara | |
| 2004/0077313 A1 | 4/2004 | Oba et al. | |
| 2004/0125087 A1 | 7/2004 | Taylor et al. | |
| 2004/0222974 A1 | 11/2004 | Hong et al. | |
| 2004/0239650 A1 | 12/2004 | Mackey | |
| 2004/0252109 A1 | 12/2004 | Trent et al. | |
| 2005/0030048 A1 | 2/2005 | Bolender et al. | |
| 2006/0006496 A1* | 1/2006 | Harris | H01L 23/5223 257/532 |
| 2006/0038754 A1 | 2/2006 | Kim | |
| 2006/0097991 A1 | 5/2006 | Hotelling et al. | |
| 2006/0114240 A1 | 6/2006 | Lin | |
| 2006/0114241 A1 | 6/2006 | Lin | |
| 2006/0132000 A1* | 6/2006 | Katsuki | G06F 3/0436 310/363 |
| 2006/0232600 A1 | 10/2006 | Kimura et al. | |
| 2007/0008299 A1 | 1/2007 | Hristov | |
| 2007/0222762 A1 | 9/2007 | Van Delden et al. | |
| 2007/0229466 A1 | 10/2007 | Peng et al. | |
| 2007/0229468 A1 | 10/2007 | Peng et al. | |
| 2007/0229469 A1 | 10/2007 | Seguine | |
| 2007/0229470 A1 | 10/2007 | Snyder et al. | |
| 2007/0242054 A1 | 10/2007 | Chang et al. | |
| 2007/0257894 A1 | 11/2007 | Philipp | |
| 2007/0262962 A1 | 11/2007 | XiaoPing et al. | |
| 2007/0262963 A1 | 11/2007 | Xiao-Ping et al. | |
| 2007/0268265 A1 | 11/2007 | XiaoPing | |
| 2007/0273659 A1 | 11/2007 | XiaoPing et al. | |
| 2007/0273660 A1 | 11/2007 | XiaoPing | |
| 2007/0279395 A1 | 12/2007 | Philipp et al. | |
| 2007/0291009 A1 | 12/2007 | Wright et al. | |
| 2008/0006453 A1 | 1/2008 | Hotelling | |
| 2008/0007534 A1 | 1/2008 | Peng et al. | |
| 2008/0062140 A1 | 3/2008 | Hotelling et al. | |
| 2008/0074398 A1 | 3/2008 | Wright | |
| 2008/0111795 A1 | 5/2008 | Bollinger | |
| 2008/0117182 A1 | 5/2008 | Um et al. | |
| 2008/0150906 A1 | 6/2008 | Grivna | |
| 2008/0158172 A1 | 7/2008 | Hotelling et al. | |
| 2008/0158181 A1 | 7/2008 | Hamblin et al. | |
| 2008/0164076 A1 | 7/2008 | Orsley | |
| 2008/0218488 A1 | 9/2008 | Yang et al. | |
| 2008/0245582 A1 | 10/2008 | Bytheway | |
| 2008/0246496 A1* | 10/2008 | Hristov | G06F 3/044 324/686 |
| 2008/0259044 A1 | 10/2008 | Utsunomiya et al. | |
| 2008/0264699 A1 | 10/2008 | Chang et al. | |
| 2008/0265914 A1 | 10/2008 | Matsushima | |
| 2008/0297176 A1 | 12/2008 | Douglas | |
| 2008/0308323 A1 | 12/2008 | Huang et al. | |
| 2008/0309635 A1 | 12/2008 | Matsuo | |
| 2009/0002337 A1 | 1/2009 | Chang | |
| 2009/0002338 A1 | 1/2009 | Kinoshita et al. | |
| 2009/0040191 A1 | 2/2009 | Tong et al. | |
| 2009/0046077 A1 | 2/2009 | Tanaka et al. | |
| 2009/0091551 A1 | 4/2009 | Hotelling et al. | |
| 2009/0096757 A1 | 4/2009 | Hotelling et al. | |

(56) References Cited

U.S. PATENT DOCUMENTS

| | | |
|---|---|---|
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0194344 A1 | 8/2009 | Harley et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0214247 A1 | 8/2010 | Tang et al. |
| 2010/0220075 A1 | 9/2010 | Kuo et al. |
| 2010/0253646 A1 | 10/2010 | Hiratsuka |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0301879 A1* | 12/2010 | Philipp ............... G06F 3/044 324/679 |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0018841 A1 | 1/2011 | Hristov |
| 2011/0022351 A1 | 1/2011 | Philipp et al. |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0187666 A1 | 8/2011 | Min |
| 2011/0242027 A1* | 10/2011 | Chang ............... G06F 3/0412 345/173 |
| 2011/0267300 A1 | 11/2011 | Serban et al. |
| 2011/0273391 A1 | 11/2011 | Bae |
| 2011/0279409 A1 | 11/2011 | Salaverry et al. |
| 2012/0044171 A1 | 2/2012 | Lee et al. |
| 2012/0050216 A1 | 3/2012 | Kremin et al. |
| 2012/0056820 A1 | 3/2012 | Corbridge |
| 2012/0227259 A1* | 9/2012 | Badaye ............... G06F 3/044 29/846 |
| 2012/0262414 A1 | 10/2012 | Lai |
| 2012/0313901 A1 | 12/2012 | Monson |

FOREIGN PATENT DOCUMENTS

| | | |
|---|---|---|
| CN | 101681221 A | 3/2010 |
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | 86/06551 A1 | 11/1986 |
| WO | 0057344 A1 | 9/2000 |
| WO | 2010117946 A2 | 10/2010 |
| WO | 2010136932 A1 | 12/2010 |

OTHER PUBLICATIONS

Quantum Research Group. "Qmatrix Technology White Paper", 2006. 4 Pages.

Lubart, et al. "One Layer Optically Transparent Keyboard for Input Display", IP.com. Mar. 1, 1979. 3 Pages.

Gary L. Barrett et al. "Projected Capacitive Touch Technology", "Touch Technology Information Display", www.informationaldisplay.org, Mar. 2010 vol. 26 No. 3, pp. 16-21.

Quantum Research Application Note An-KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", Apr. 28, 2003, Total of 7 pages.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch: Electrovibration for Touch Surfaces", 2010.

Colin Holland. "SID: Single Layer Technology Boosts Capacitive Touchscreens", www.eetimes.com/General. 2011.

"Novel Single Layer Touchscreen Based on Indium", 2011.

"Mesh Patterns for Capacitive Touch or Proximity Sensors", IP.com. May 14, 2010. 3pages.

"IDT Claims World's First True Single-Layer Multi-Touch Projected Capacitive Touch Screen Technology", EE Times Europe. Dec. 8, 2010.

Tracy V. Wilson et al. "How the iPhone Works", HowStuffWorks "Multi-touch Systems". 2011.

Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.

Mike Williams, "Dream Screens from Graphene", Technology Developed at Rice could Revolutionize Touch-Screen Displays. Aug. 2011.

ASIC Packaging Guidebook, Toshiba Corporation. (2000). 35 pages.

(56) References Cited

OTHER PUBLICATIONS

Fujitsu Microelectronics Limited. "IC Package." (2002). 10 pages.
International Search Report, PCT/US2013/021314 dated Jun. 25, 2013.
Chinese Patent Applicaiton 201380013665.X , English translation Office Action dated Jan. 4, 2017, Consists of 7 pages.

\* cited by examiner

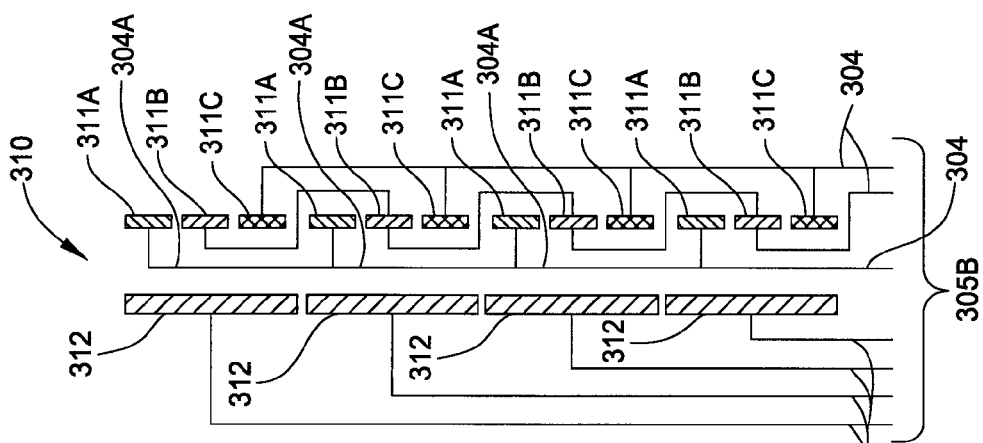
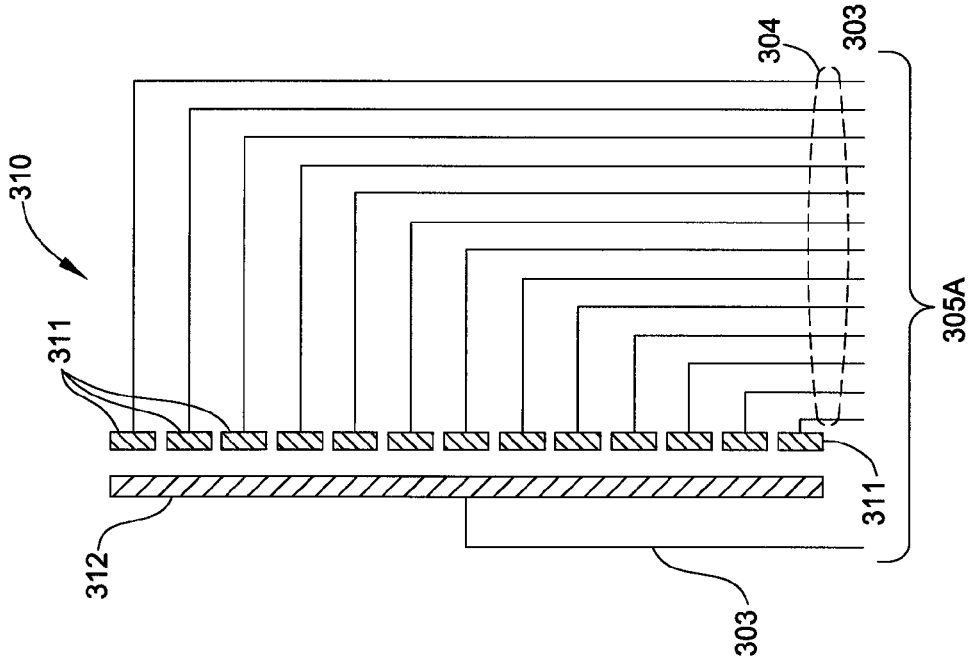
FIG. 3C
FIG. 3B
FIG. 3A

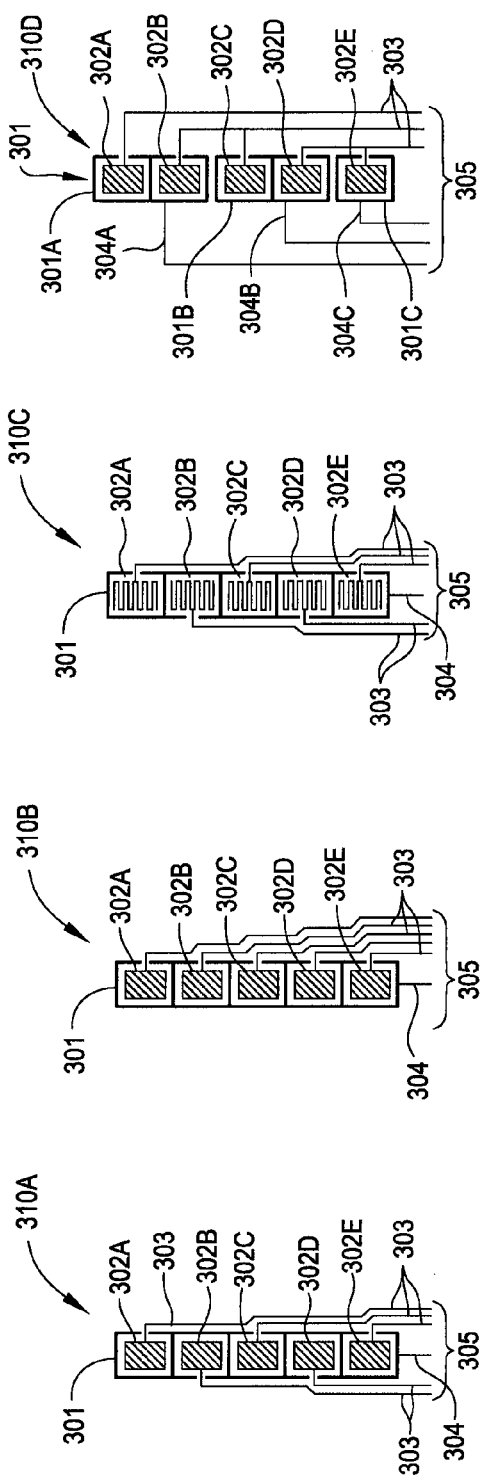

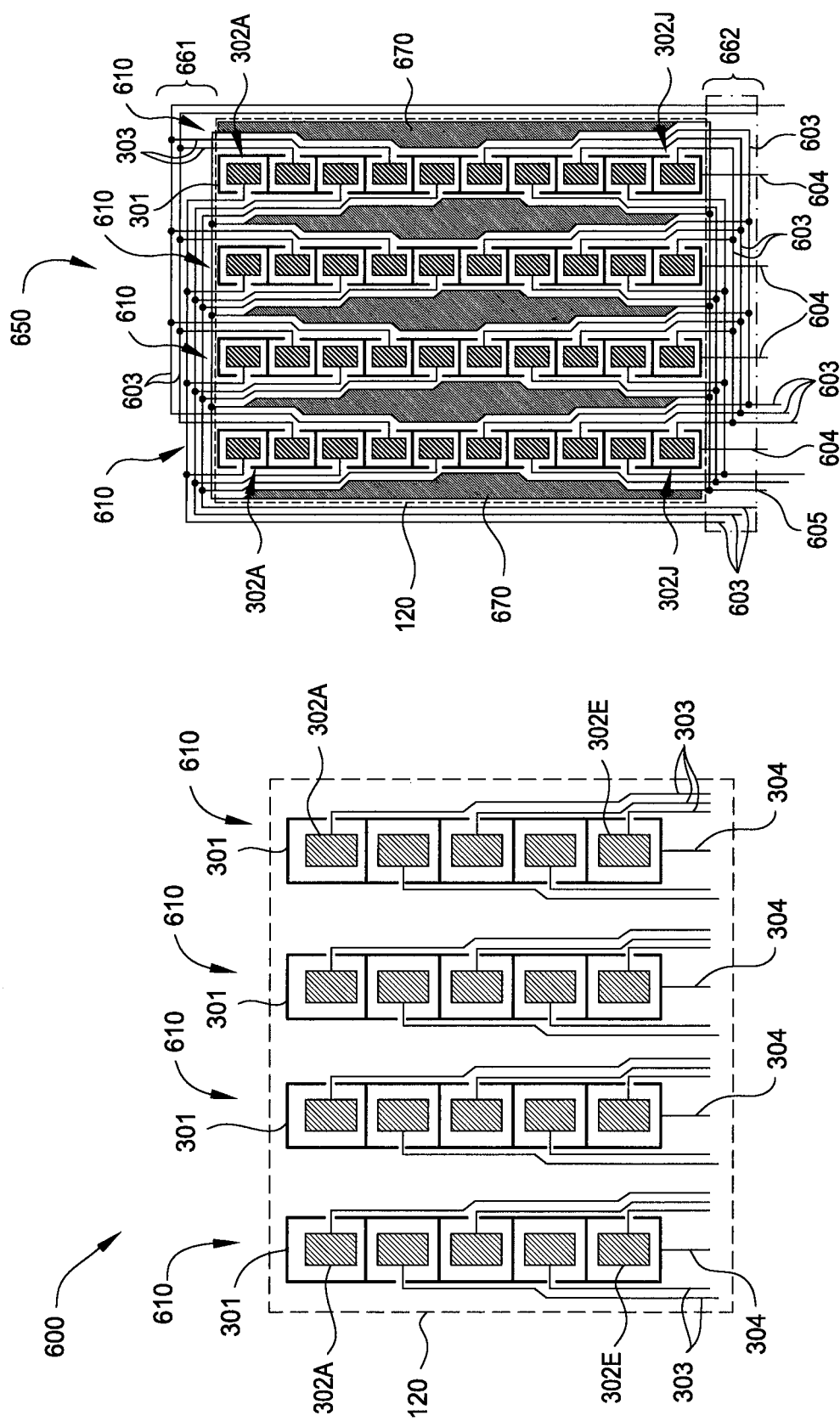

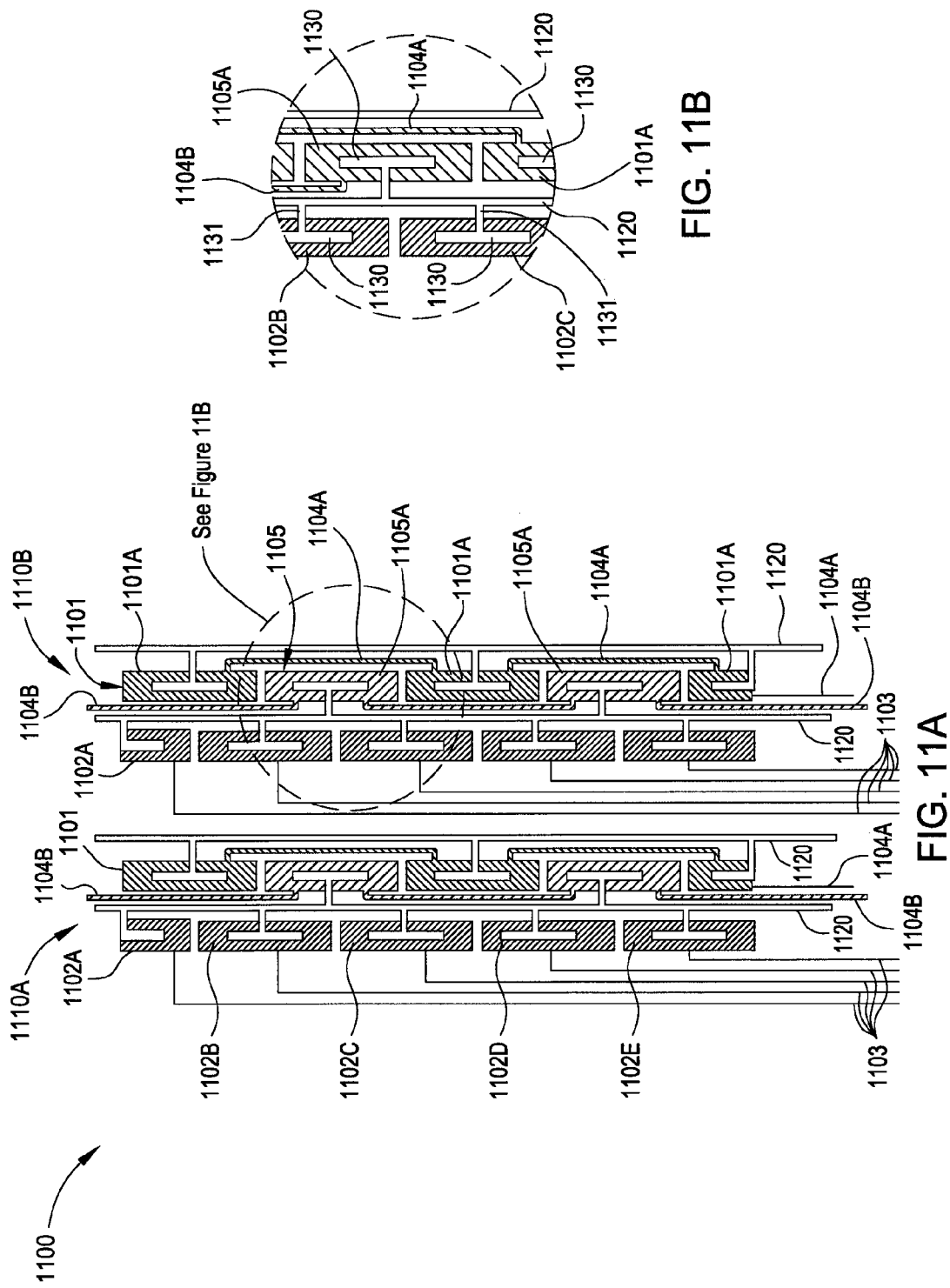

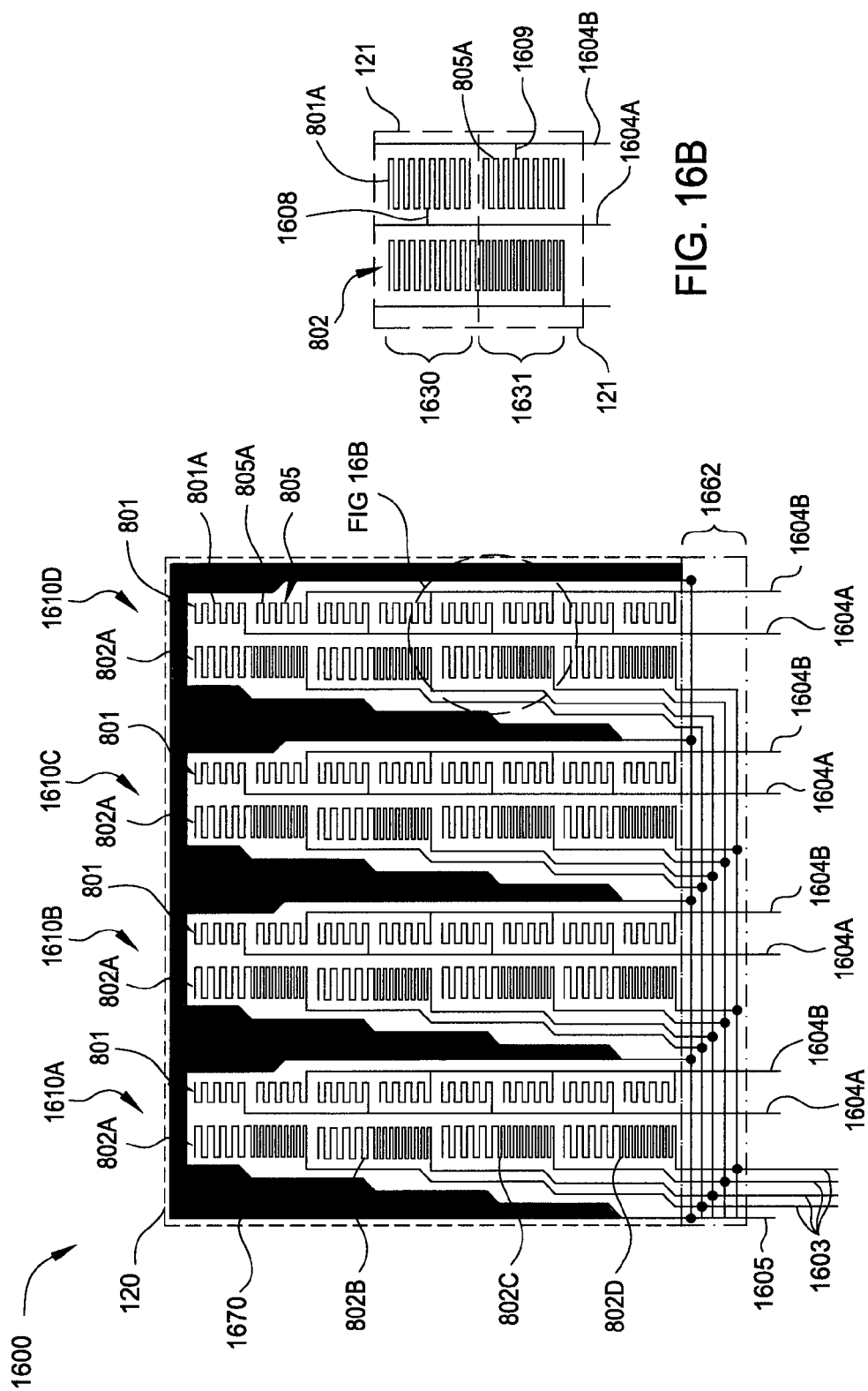

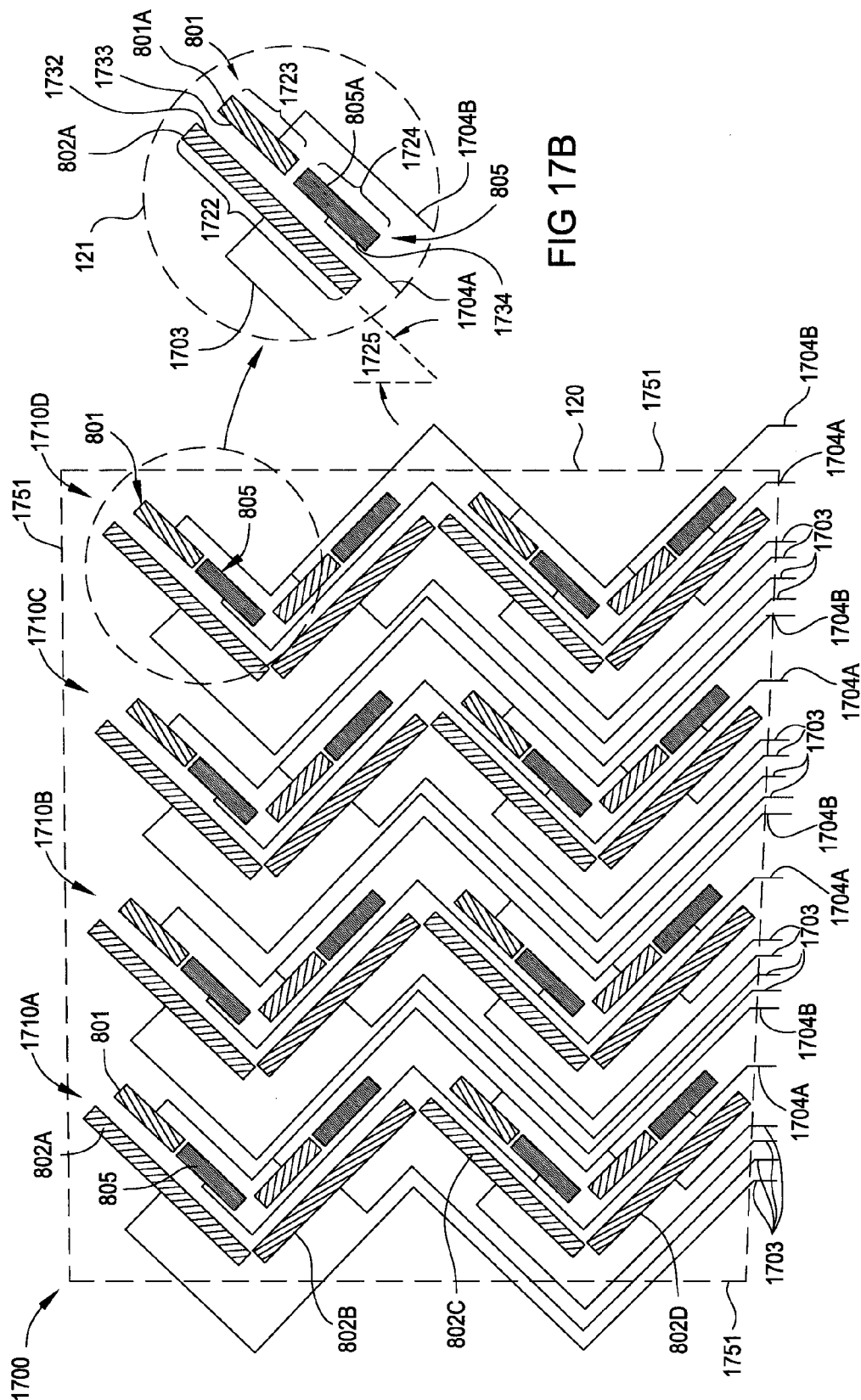

SINGLE LAYER CAPACITIVE IMAGING SENSORS

CROSS-REFERENCE TO RELATED APPLICATIONS

This application is a continuation of U.S. patent application Ser. No. 13/740,121, filed Jan. 11, 2013, which claims benefit of U.S. provisional patent application Ser. No. 61/586,076, filed Jan. 12, 2012, both of which are herein incorporated by reference.

BACKGROUND OF THE INVENTION

Field of the Invention

Embodiments of the present invention generally relate to a system and method for sensing an input object's position over a sensing region of a proximity sensing device.

Description of the Related Art

Input devices including proximity sensor devices, also commonly called touchpads or touch sensor devices, are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems, such as opaque touchpads integrated in, or peripheral to, notebook or desktop computers. Proximity sensor devices are also often used in smaller computing systems, such as touch screens integrated in cellular phones.

Proximity sensor devices are typically used in combination with other supporting components, such as display or input devices found in the electronic or computing system. In some configurations, the proximity sensor devices are coupled to these supporting components to provide a desired combined function or to provide a desirable complete device package. Many commercially available proximity sensor devices utilize one or more electrical techniques to determine the presence, location and/or motion of an input object, such as a capacitive or a resistive sensing technique. Typically, the proximity sensor devices utilize an array of sensor electrodes to detect the presence, location and/or motion of an input object. Due to the often large number of sensor electrodes used to sense the presence and position of an input object with desirable accuracy, and also the need to connect each of these sensor electrodes to the various signal generation and data collection components in the electronic or computing system, the cost associated with forming these interconnections, the reliability of the system and the overall size of the of the proximity sensor device are often undesirably large and complex. It is a common goal in the consumer and industrial electronics industries to reduce the cost and/or size of the electrical components in the formed electronic device. One will note that the cost and size limitations placed on the proximity sensor device are often created by the number of traces that are required, the number of required connection points, the connection component's complexity (e.g., number of pins on a connector) and the complexity of the flexible components used to interconnect the sensor electrodes to the control system.

Moreover, the greater the length of the traces used to interconnect the sensor electrodes to the computer system, the more susceptible the proximity sensor device is to interference, such as electromagnetic interference (EMI), commonly generated by the other supporting components. The interference provided by these supporting components will adversely affect the reliability and accuracy of the data collected by the proximity sensing device.

Therefore, there is a need for an apparatus and method of forming a proximity sensing device that is reliable, provides consistent and accurate position sensing results, is inexpensive to produce and can be integrated within a desirably sized electronic system.

SUMMARY OF THE INVENTION

Embodiments of the invention generally provide an input device having a reduced system complexity, smaller overall physical size and low production cost. The input device described herein can provide more reliable and accurate position sensing data and/or position sensing results based on the signals generated by the interaction of an input object with an input region of the input device. Embodiments of the invention generally provide an input device that uses arrays of sensor electrodes and/or sensor electrode interconnection schemes to form the position sensing data. Embodiments of the invention described herein thus provide an improved apparatus and method for reliably sensing the presence of an object by a touch sensing device. Also, one or more of the embodiments described herein, utilizes one or more of the techniques and electrode array configurations disclosed herein to reduce or minimize the number of traces and/or sensor electrodes required to sense the position of an input object within the sensing region.

Embodiments of the invention generally provide a capacitive image sensor that includes a first set of sensor electrodes and a second set of sensor electrodes. The first set of sensor electrodes includes a first sensor electrode, a second sensor electrode and a third sensor electrode. The first sensor electrode is electrically coupled to the third sensor electrode. The second set of sensor electrodes includes a fourth sensor electrode and a fifth sensor electrode, wherein the fourth sensor electrode is configured to capacitively couple with the first sensor electrode, and the fifth sensor electrode is configured to capacitively couple with the third sensor electrode.

Embodiments of the invention may further provide a capacitive image sensor that includes a first sensor electrode disposed on a first surface of a substrate, a second sensor electrode disposed on the first surface of the substrate, and a third sensor electrode disposed on the first surface of the substrate. The third sensor electrode is disposed between the first sensor electrode and the second sensor electrode, and is interdigitated with the first sensor electrode and interdigitated with the second sensor electrode.

Embodiments of the invention may further provide a touch screen that includes a sensor processor and a plurality of sensor electrodes disposed on a substrate, the plurality of sensor electrodes comprising a first sensor electrode disposed on a first surface of the substrate, a second sensor electrode disposed on the first surface of the substrate, and a third sensor electrode disposed on the first surface of the substrate. The third sensor electrode partially enclosing the first sensor electrode and partially enclosing the second sensor electrode, and at least a portion of the third sensor electrode is disposed between the first sensor electrode and the second sensor electrode. The sensor processor communicatively coupled to the first, second and third sensor electrodes, and configured to receive resulting signals received by the third sensor electrode when either the first or second sensor electrode is driven for capacitive sensing. The sensor processor further comprising a first receiver channel coupled to the third receiver electrode, and wherein the first receiver channels comprises a charge accumulator.

Embodiments of the invention may further provide a capacitive image sensor that includes a first set of sensor electrodes and a second set of sensor electrodes. The first sensor electrode includes a first sensor electrode, a second sensor electrode and a third sensor electrode, and first sensor electrode is electrically coupled to the third sensor electrode. The second set of sensor electrodes comprising a fourth sensor electrode and a fifth sensor electrode, wherein the fourth sensor electrode is configured to capacitively couple with the first sensor electrode, and the fifth sensor electrode is configured to capacitively couple with the third sensor electrode.

Embodiments of the invention may further provide a touch screen that includes a plurality of sensor electrodes disposed on a surface of a transparent substrate, the plurality of sensor electrodes including a first set of sensor electrodes, a second set of sensor electrodes and a sensor processor. The first set of sensor electrodes include a first receiver electrode, a second receiver electrode and a third receiver electrode, and the first receiver electrode is electrically coupled to the third receiver electrode. The second set of sensor electrodes include a first transmitter electrode and a second transmitter electrode, wherein the first transmitter electrode is configured to capacitively couple with the first receiver electrode, and the second transmitter electrode is configured to capacitively couple with the third receiver electrode. The sensor processor communicatively coupled to the first and second receiver electrodes, and configured to receive resulting signals received by the first, second and third receiver electrodes when the first or second transmitter electrode is driven for capacitive sensing, wherein the sensor processor comprises a first receiver channel coupled to the first receiver electrode and a second receiver channel coupled to the second receiver electrode, and wherein the first and second receiver channels comprises a charge accumulator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a table listing some examples of sensor electrode configurations that can be used in an input device, according to one or more of the embodiments described herein.

FIG. 3B is a schematic diagram illustrating a sensor electrode configuration listed in the table shown in FIG. 3A, according to one or more of the embodiments described herein.

FIG. 3C is a schematic diagram illustrating a sensor electrode configuration listed in the table shown in FIG. 3A, according to one or more of the embodiments described herein.

FIGS. 4A-4K are each schematic diagrams illustrating a plurality of sensor electrodes that are positioned to form an array of sensor electrodes, according to one or more of the embodiments described herein.

FIG. 6A is a schematic diagram illustrating a sensor electrode set that includes multiple arrays of sensor electrodes that each contain a plurality of sensor electrodes, according to one or more of the embodiments described herein.

FIG. 6B is a schematic diagram illustrating a sensor electrode set that includes multiple arrays of sensor electrodes that each contain a plurality of sensor electrodes, according to one or more of the embodiments described herein.

FIG. 11A is a schematic diagram illustrating a sensor electrode set that includes multiple arrays of sensor electrodes that each contain a plurality of sensor electrodes, according to one or more of the embodiments described herein.

FIG. 11B is an enlarged schematic view of a portion of an array of sensor electrodes shown in FIG. 11A, according to one or more of the embodiments described herein.

FIG. 16A is a schematic diagram illustrating a sensor electrode set that includes multiple arrays of sensor electrodes that each contain a plurality of sensor electrodes, according to one or more of the embodiments described herein.

FIG. 16B is an enlarged schematic view of a portion of an array of sensor electrodes shown in FIG. 16A, according to one or more of the embodiments described herein.

FIG. 17A is a schematic diagram illustrating a sensor electrode set that includes multiple arrays of sensor electrodes that each contain a plurality of sensor electrodes, according to one or more of the embodiments described herein.

FIG. 17B is an enlarged schematic view of a portion of an array of sensor electrodes shown in FIG. 17A, according to one or more of the embodiments described herein.

Figure 1:
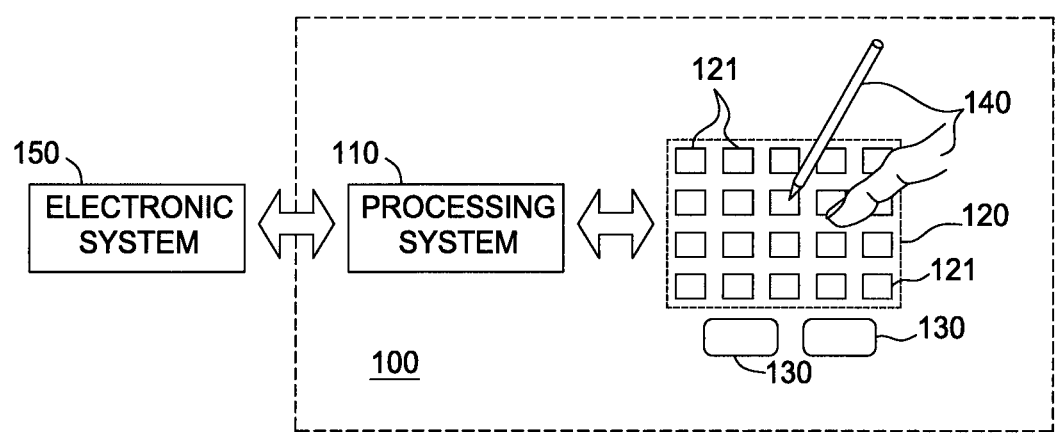
FIG. 1 is a schematic block diagram of an exemplary input device, in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention generally provide an input device having a reduced system complexity, small overall physical size and low production cost. One or more of the embodiments discussed herein comprise an input device that includes a plurality of sensing elements that are interconnected in desired way to reliably and accurately acquire positional information of an input object. The acquired positional information may be used to control the system's operation mode, as well as graphical user interface (GUI) actions, such as cursor movement, selection, menu navigation, and other functions. In one embodiment, one or more capacitive sensing techniques and/or novel sensor electrode array configurations are used to reduce or minimize the number of traces and/or sensor electrodes required to sense the positional information of an input object within the sensing region of the input device.

FIG. 1 is a block diagram of an exemplary input device 100, in accordance with embodiments of the invention. In FIG. 1, the input device 100 is a proximity sensor device (e.g., "touchpad," "touch screen," "touch sensor device") configured to sense inputs provided by one or more input objects 140 positioned in a sensing region 120. Example input objects include fingers and styli, as shown in FIG. 1. In some embodiments of the invention, the input device 100 may be configured to provide input to an electronic system 150, which is sometimes referred to herein as the "host." As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include input device 100 and separate joysticks or key switches. Further examples of electronic systems 150 include peripherals, such as data input devices (e.g., remote controls and mice) and data output devices (e.g., display screens and printers). Other examples include remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system 150 using any one or more of the following: buses, networks, and other wired or wireless interconnections. Examples include $I^2C$, SPI, PS/2, Universal Serial Bus (USB), Bluetooth, RF, and IRDA.

Sensing region 120 encompasses any space above, around, in and/or near the input device 100 in which the input device 100 is able to detect user input by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 generally comprises one or more sensing elements 121 for detecting user input. As several non-limiting examples, the one or more sensing elements 121 in the input device 100 may use capacitive, elastive, resistive, inductive, magnetic acoustic, ultrasonic, and/or optical techniques to detect the position or motion of the input object(s) 140. Some implementations are configured to provide sensing images that span one, two, three, or higher dimensional spaces.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing elements 121 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the input device 100. Each module may comprise circuitry that is a part of the processing system 110, firmware, software, or a combination thereof. In various embodiments, different combinations of modules may be used. In one example, modules include hardware operation modules for operating hardware such as sensing elements and display screens, data processing modules for processing data, such as sensor signals, and positional information, and reporting modules for reporting information. In another example, modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. In one example, as noted above, actions may include changing operation modes, as well as GUI actions, such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system process information received from the processing system 110 is used to act on user input, such as to facilitate a full range of actions, including mode changing actions and GUI actions. For example, in some embodiments, the processing system 110 operates the sensing element(s) 121 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline set of data (e.g., baseline image), such that the information reflects a difference between the acquired electrical signals (e.g., sensing image) and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of a display device (not shown). For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. Some embodiments of the input device 100 include at least part of the display device. For example, some embodiments may utilize some of the same electrical components for displaying and sensing. In some examples, the display screen of the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In many embodiments, the positional information of the input object 140 relative to the sensing region 120 is monitored or sensed by use of one or more sensing elements 121 (FIG. 1) that are positioned to detect its "positional information." In general, the sensing elements 121 may comprise one or more sensing elements or components that are used to detect the presence of an input object. As discussed above, the one or more sensing elements 121 of the input device 100 may use capacitive, elastive, resistive, inductive, magnetic acoustic, ultrasonic, and/or optical techniques to sense the positional information of an input object. While the information presented below primarily discuses the operation of an input device 100, which uses capacitive sensing techniques to monitor or determine the positional information of an input object 140 this configuration is not intended to be limiting as to the scope of the invention described herein, since other sensing techniques may be used.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In one embodiment of the input device 100, the sensing element 121 is a capacitive sensing element that is used to sense the positional information of the input object(s). In some capacitive implementations of the input device 100, voltage or current is applied to the sensing elements to create an electric field between an electrode and ground. Nearby input objects 140 cause changes in the electric field, and produce detectable changes in capacitive coupling that may be detected as changes in voltage, current, or the like. Some capacitive implementations utilize arrays or other regular or irregular patterns of capacitive sensing elements to create electric fields. In some capacitive implementations, portions of separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between one or more sensing elements, or one or more sensor electrodes, and an input object. In various embodiments, an at least partially grounded input object positioned near the sensor electrodes alters the electric field near the sensor electrodes, thus changing the measured capacitive coupling of the sensor electrodes to ground. In one implementation, an absolute capacitance sensing method operates by modulating sensor electrodes with respect to a reference voltage (e.g., system ground), and by detecting the capacitive coupling between the sensor electrodes and the at least partially grounded input object(s).

Some capacitive implementations utilize "mutual capacitance" (or "transcapacitance") sensing methods based on changes in the capacitive coupling between two or more sensing elements (e.g., sensor electrodes). In various embodiments, an input object near the sensor electrodes alters the electric field created between the sensor electrodes, thus changing the measured capacitive coupling. In one implementation, a transcapacitive sensing method operates by detecting the capacitive coupling between one or more transmitter sensor electrodes (also "transmitter electrodes," "transmitting electrodes" or "transmitters") and one or more receiver sensor electrodes (also "receiver electrodes" or "receiving electrodes"). Transmitter sensor electrodes may be modulated relative to a reference voltage (e.g., system ground) to transmit transmitter signals. Receiver sensor electrodes may be held substantially constant relative to the reference voltage to facilitate receipt of "resulting signals." A "resulting signal" may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some implementations user input from an actively modulated device (e.g. an active pen) may act as a transmitter such that each of the sensor electrodes act as a receiver to determine the position of the actively modulated device.

Most conventional multi-touch sensing sensor devices, in which the location of more than one finger or other input can be accurately determined, comprise a matrix of transmitter sensor electrodes and receiver sensor electrodes. Conventionally, during operation, capacitive images are formed by measuring the capacitance formed between each transmitter and receiver sensor electrode (referred to as "transcapacitance" or "mutual capacitance"), forming a matrix or grid of capacitive detecting elements across the sensing region 120. The presence of an input object (such as a finger or other object) at or near an intersection between transmitter and receiver sensor electrodes changes the measured "transcapacitance". These changes are localized to the location of object, where each transcapacitive measurement is a pixel of a "capacitive image" and multiple transcapacitive measurements can be utilized to form a capacitive image of the object.

Herein sensor design and sensing scheme embodiments are described that allow the creation of 2-D capacitance images using a single sensing layer in which all of the transmitting and receiving sensor electrodes are disposed in a single common layer with one another without the use of jumpers within the sensor area. The electronics to drive the sensor are located in a processing system, such as processing system 110 described herein. These described embodiments also facilitate contact sensing, proximity sensing, and position sensing. These described embodiments also facilitate "multi-touch" sensing, such as two finger rotation gestures and two finger pinch gestures, but with a less expensive sensor compared to a sensor that utilizes sensor electrodes in multiple layers. The reduced number of layers used to form the input device described herein versus other conventional position sensing devices also equates to fewer production steps, which in itself will reduce the production cost of the device. The reduction in the layers of the input device also decreases interference or obscuration of an image or display that is viewed through the sensor, thus lending itself to improved optical quality of the formed input device when it is integrated with a display device. Additional electrodes involved in sensing the shape of the electric fields of the transmitters and receivers, such as floating electrodes or shielding electrodes, may be included in the device and may be placed on other substrates or layers. The electrodes may be part of a display (share a substrate) and may even share functionality with the display (used for both display and sensing functionality). For example electrodes may be patterned in the Color filter of an LCD (Liquid Crystal Display) or on the sealing layer of an OLED (Organic Light Emitting Diode) display. Alternately, sensing electrodes within the display or on TFT (Thin Film Transistor) layer of an active matrix display may also be used as gate or source drivers. Such electrodes may be patterned (e.g. spaced or oriented at an angle relative to the pixels) such that they minimize any visual artifacts. Furthermore, they may use hiding layers (e.g. Black Mask between pixels) to hide at least some portion of one or more conductive electrodes.

Figure 2A:
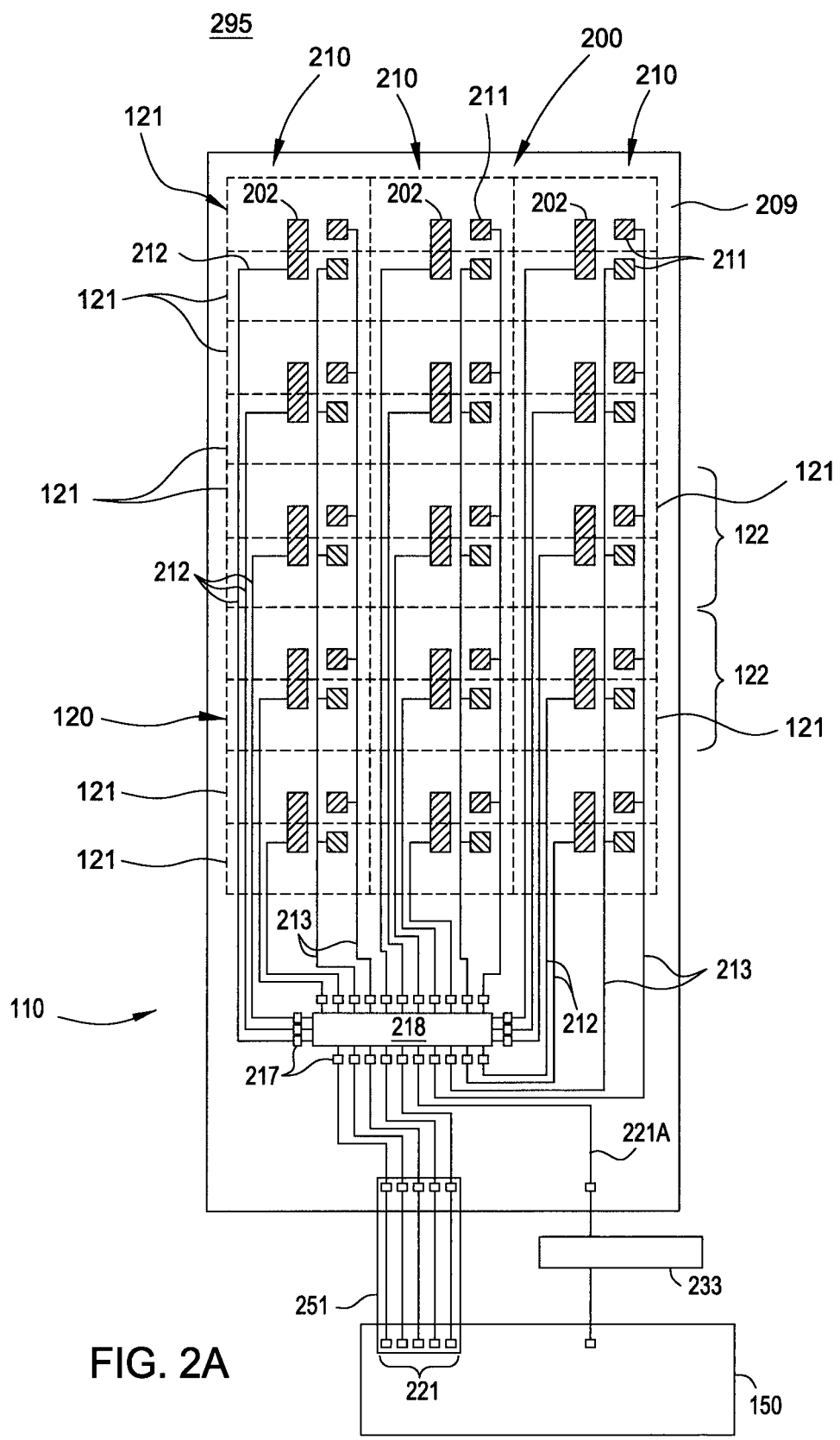
FIG. 2A is a schematic diagram illustrating an input device, according to one or more of the embodiments described herein.

FIG. 2A is a schematic top view of a portion of an input device 295 that illustrates a portion of a sensor electrode pattern that may be used to sense the positional information of an input object within the sensing region 120 using a transcapacitive sensing method. One will note that the input device 295 may be formed as part of a larger input device 100, which is discussed above. In general, the sensor electrode pattern disclosed herein comprises a sensor array set 200 that includes a plurality of sensor electrode arrays 210 that include a plurality of sensor electrodes, such as sensor electrodes 202 and 211, that are arranged and interconnected in a desirable manner to reduce or minimize the number of traces and/or sensor electrodes required to sense the positional information of an input object within the sensing region 120 of the input device 295. For clarity of illustration and description, while FIG. 2A illustrates a pattern of simple rectangles used to represent the sensor electrodes, this configuration is not meant to be limiting and in other embodiments, various other sensor electrode shapes may be used as discussed further herein. In other some embodiments, sensing elements 121 comprise two or more sensor electrodes, for example, sensor electrodes 202 and 211 that may be similar or different in size and/or shape. In one example, as shown, these sensor electrodes are disposed in a sensor electrode pattern that comprises a first plurality of sensor electrodes 202 (e.g., 15 shown) and a second plurality of sensor electrodes 211 (e.g., 30 shown), which are disposed on the same layer as the first plurality of sensor electrodes 202. Sensor electrodes 202 and sensor electrodes 211 are typically ohmically isolated from each other, by use of insulating materials or a physical gap formed between the electrodes to prevent them from electrically shorting to each other. In some configurations, two or more sensing elements 121 may form a larger unit cell 122. A unit cell 122 includes a grouping of sensor electrodes that are repeated within a sensor electrode array 210 and/or in a repeating pattern across the sensing region 120 (e.g., multiple sensor electrode arrays 210). The unit cell 122 is the smallest unit a symmetric grouping of sensor electrodes can be broken into within an electrode pattern formed across the sensing region 120. As illustrated in FIG. 2A, in one example, the unit cell 122 includes two sensing elements 121, which each contain a portion of the sensor electrode 202 and the sensor electrode 211, and thus the unit cell 122 comprises a sensor electrode 202 and two sensor electrodes 211. One will note that the sensor electrode pattern of FIG. 2A may alternatively utilize various sensing techniques, such as mutual capacitive sensing, absolute capacitive sensing, elastive, resistive, inductive, magnetic acoustic, ultrasonic, or other useful sensing techniques, without deviating from the scope of the invention described herein. Sensor electrode 202 maybe be a transmitter and 211 maybe a receiver, or vice versa (the other way around) with typically similar imaging capability.

In one embodiment, as illustrated in FIG. 2A, the sensing elements 121 may comprise a plurality of transmitter and receiver electrodes that are formed in a single layer on a surface of a substrate 209. In one configuration of the input device 295, each of the sensor electrodes may comprise one or more transmitter electrodes (e.g. sensor electrodes 202) that are disposed proximate to one or more receiver electrodes (e.g. sensor electrodes 211). In one example, a transcapacitive sensing method using the single layer sensor electrode design, may operate by detecting the change in capacitive coupling between one or more of the driven transmitter sensor electrodes and one or more of the receiver electrodes, as similarly discussed above. In such embodiments, the transmitter and receiver electrodes may be disposed in such a way such that jumpers and/or extra layers used to form the area of capacitive pixels are not required. In various embodiments, the transmitter electrodes and receiver electrodes may be formed in an array on the surface of a substrate 209 by first forming a blanket conductive layer on the surface of the substrate 209 and then performing an etching and/or patterning process (e.g., lithography and wet etch, laser ablation, etc.) that ohmically isolates each of the transmitter electrodes and receiver electrodes from each other. In other embodiments, the sensor electrodes may be patterned using deposition and screen printing methods. As illustrated in FIG. 2A, these sensor electrodes may be disposed in an array that comprises a rectangular pattern of sensing elements 121, which may comprise one or more transmitter electrodes and one or more receiver electrodes. In one example, the blanket conductive layer used to form the transmitter electrodes and receiver electrodes comprises a thin metal layer (e.g., copper, aluminum, etc.) or a thin transparent conductive oxide layer (e.g., ATO, ITO, Zinc oxide) that is deposited using convention deposition techniques known in the art (e.g., PVD, CVD). In various embodiments, patterned isolated conductive electrodes (e.g., electrically floating electrodes) may be used to improve visual appearance. In one or more of the embodiments described herein, the sensor electrodes are formed from a material that is substantially optically clear, and thus, in some configurations, can be disposed between a display device and the input device user.

The areas of localized capacitive coupling formed between at least a portion of one or more sensor electrodes 202 and at least a portion of one or more sensor electrodes 211 may be termed a "capacitive pixel," or also referred to herein as the sensing element 121. For example, as shown in FIG. 2A, the capacitive coupling in a sensing element 121 may be created by the electric field formed between at least a portion of the sensor electrodes 202 and a sensor electrode 211, which changes as the proximity and motion of input objects across the sensing region changes.

In some embodiments, the sensing elements 121 are "scanned" to determine these capacitive couplings. The input device 295 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. In one example, the transmitter electrodes are the sensor electrodes 202 and the receiver electrodes are the sensor electrodes 211. For example, in one configuration, multiple sensor electrodes 202 transmit different transmitter signals according to one or more coding schemes that enable their combined effects on the resulting signals received by the receiving sensor electrodes, or sensor electrodes 211, to be independently determined. The direct effect of a user input which is coupled to the device may affect (e.g. reduce the fringing coupling) of the resulting signals. Alternately, a floating electrode may be coupled to the input and to the transmitter and receiver and the user input may lower its impedance to system ground and thus reduce the resulting signals. In a further example, a floating electrode may be displaced toward the transmitter and receiver which increases their relative coupling. The receiver electrodes, or a corresponding sensor electrode 211, may be operated singly or multiply to acquire resulting signals created from the transmitter signal. The resulting signals may be used to determine measurements of the capacitive couplings at the capacitive pixels, which are used to determine whether an input object is present and its positional information, as discussed above. A set of values for the capacitive pixels form a "capacitive image" (also "capacitive frame" or "sensing image") representative of the capacitive couplings at the pixels. In various embodiments, the sensing image, or capacitive image, comprises data received during a process of measuring the resulting signals received with at least a portion of the sensing elements 121 distributed across the sensing region 120. The resulting signals may be received at one instant in time, or by scanning the rows and/or columns of sensing elements distributed across the sensing region 120 in a raster scanning pattern (e.g., serially polling each sensing element separately in a desired scanning pattern), row-by-row scanning pattern, column-by-column scanning pattern or other useful scanning technique. In many embodiments, the rate that the "sensing image" is acquired by the input device 100, or sensing frame rate, is between about 60 and about 180 Hertz (Hz), but can be higher or lower depending on the desired application.

In some touch screen embodiments, the sensing elements 121 are disposed on a substrate of an associated display device. For example, the sensor electrodes 202 and/or the sensor electrodes 211 may be disposed on a polarizer, a color filter substrate, or a glass sheet of an LCD. As a specific example, the sensor electrodes 202 and 211 may be disposed on a TFT (Thin Film Transistor) substrate of an LCD type of the display device, a color filter substrate, on a protection material disposed over the LCD glass sheet, on a lens glass (or window), and the like. The electrodes may be separate from and in addition to the display electrodes, or shared in functionality with the display electrodes. Similarly, an extra layer may be added to a display substrate or an additional process such as patterning applied to an existing layer.

In some touchpad embodiments, the sensing elements 121 are disposed on a substrate of a touchpad. In such an embodiment, the sensor electrodes in each sensing element 121 and/or the substrate may be substantially opaque. In some embodiments, the substrate and/or the sensor electrodes of the sensing elements 121 may comprise a substantially transparent material.

In those embodiments, where sensor electrodes of each of the sensing elements 121 are disposed on a substrate within the display device (e.g., color filter glass, TFT glass, etc.), the sensor electrodes may be comprised of a substantially transparent material (e.g., ATO, ClearOhm™) or they may be comprised of an opaque material and aligned with the pixels of the display device. Electrodes may be considered substantially transparent in a display device if their reflection (and/or absorption) of light impinging on the display is such that human visual acuity is not disturbed by their presence. This may be achieved by matching indexes of refraction, making opaque lines narrower, reducing fill percentage or making the percentage of material more uniform, reducing spatial patterns (e.g. moire') that are with human visible perception, and the like.

In one configuration, as illustrated in FIG. 2A and further discussed below, the processing system 110 of the input device 295 comprises a sensor controller 218 that is coupled through connectors 217 to each of the transmitter and receiver electrodes, such as sensor electrodes 202 and 211, through one or more traces (e.g., traces 212 and 213) respectively. In one embodiment, the sensor controller 218 is generally configured to transmit the transmitter signal and receive the resulting signals from receiver electrodes. The sensor controller 218 is also generally configured to communicate the positional information received by the sensing elements 121 to the electronic system 150 and/or the display controller 233, which is also coupled to the electronic system 150. The sensor controller 218 may be coupled to the electronic system 150 using one or more traces 221 that may pass through a flexible element 251 and be coupled to the display controller 233 using one or more traces 221A that may pass through the same flexible element 251 or a different connecting element, as shown. While the processing system 110 illustrated in FIG. 2A schematically illustrates a single component (e.g., IC device) to form the sensor controller 218, the sensor controller 218 may comprise two or more controlling elements (e.g., IC devices) to control the various components in the processing system 110 of the input device 295. The controller devices may be placed onto display substrates such as TFT or Color Filter/Sealing layers (e.g. as a Chip On Glass).

In one configuration, the functions of the sensor controller 218 and the display controller 233 may be implemented in one integrated circuit that can control the display module elements and drive and/or sense data delivered to and/or received from the sensor electrodes. In various embodiments, calculation and interpretation of the measurement of the resulting signals may take place within the sensor controller 218, display controller 233, a host electronic system 150, or some combination of the above. In some configurations, the processing system 110 may comprise a transmitter circuitry, receiver circuitry, and memory that is disposed within one or any number of ICs found in the processing system 110, depending to the desired system architecture.

Figure 2B:
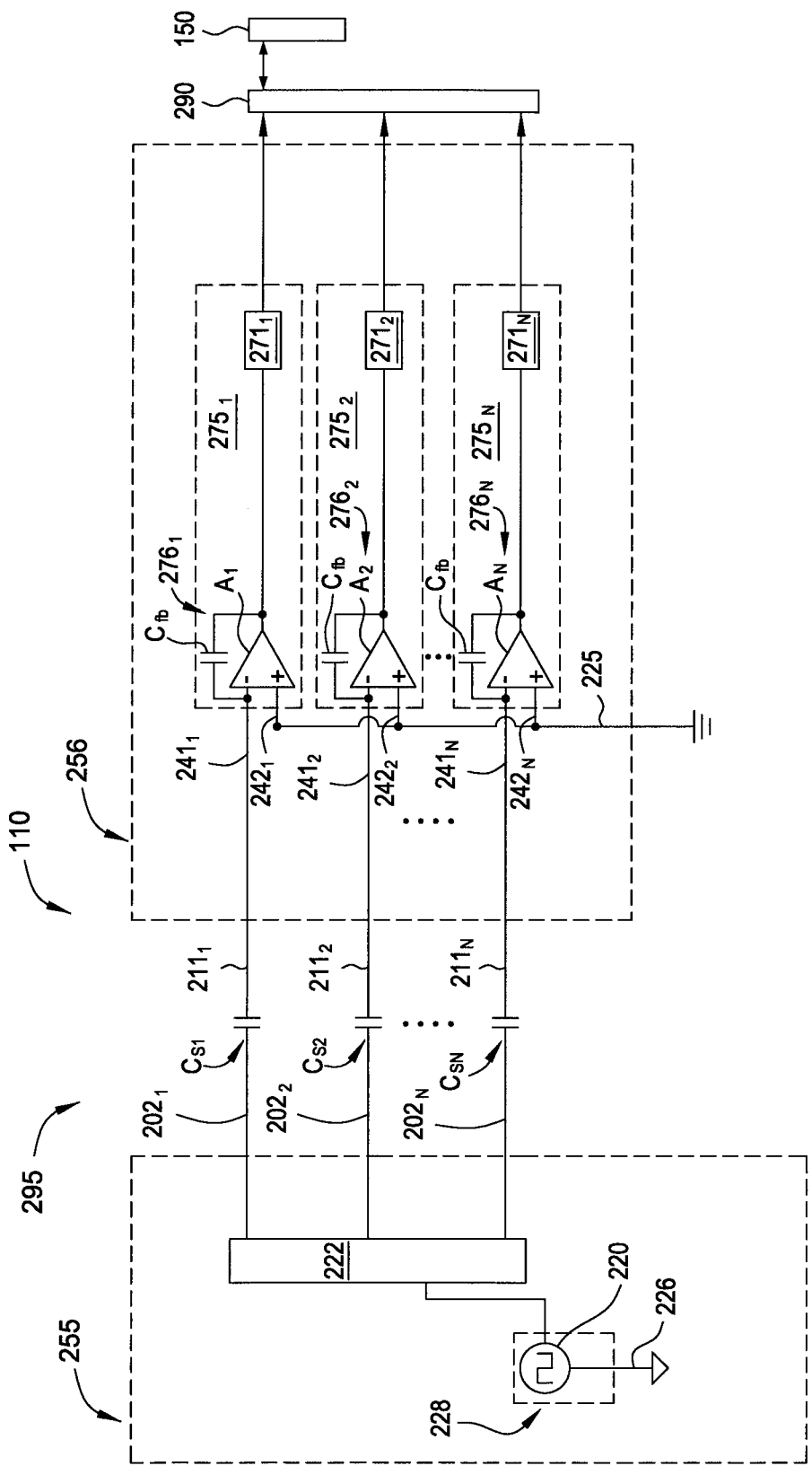
FIG. 2B is a schematic diagram illustrating a portion of an input device, according to one or more of the embodiments described herein.

FIG. 2B is a schematic view of a portion of the processing system 110 of the input device 295 according to one or more of the embodiments described herein. In one configuration, the sensor controller 218 includes a signal generating processor 255 and sensor processor 256 that work together to provide touch sensing data to an analysis module 290 and the electronic system 150. The analysis module 290 may be part of the processing system 110, the sensor processor 256 and/or part of the electronic system 150. In various embodiments, the analysis module 290 will comprises digital signal processing elements and/or other useful digital and analog circuit elements that are connected together to process the receiver channel output signal(s) received from at least one receiver channel that is coupled to a receiver electrode, and also provide processed signals to other portions of the electronic system 150. The electronic system 150 can then use the processed signals to control some aspect of the input device 295, such as send a message to the display, perform some calculation or software related task based on instructions created by one or more software programs that are being run by the electronic system and/or perform some other function.

As illustrated in FIG. 2B, the processing system 110 may comprise a signal generating processor 255 and a sensor processor 256 that work together to provide receiver channel output signals to the analysis module 290 and/or the electronic system 150. As discussed above, the positional information of an input object 140 (FIG. 1) is derived based on the capacitance $C_s$ (e.g., capacitance $C_{S1}$, $C_{S2}$, $C_{SN}$) measured between each of the transmitter electrodes (e.g., sensor electrodes $202_1$, $202_2$, ... $202_N$) and the receiver electrodes (e.g., sensor electrodes $211_1$, $211_2$, ... $211_N$).

In one embodiment, as shown in FIG. 2B, the signal generating processor 255 comprises a driver 228, which are adapted to deliver capacitive sensing signals (transmitter signals) to the transmitter electrodes. In one configuration, the driver 228 may comprise a power supply and signal generator 220 that is configured to deliver a square, rectangular, trapezoidal, sinusoidal, Gaussian or other shaped waveforms used to form the transmitter signal(s) to the transmitter electrodes. In one configuration, the signal generator 220 comprises an electrical device, or simple switch, that is able to deliver a transmitter signal that transitions between the output level of the power supply and a low display voltage level. In various embodiments, signal generator 220 may comprise an oscillator. In some configurations, the signal generator 220 is integrated into the driver 222, which includes one or more shift registers (not shown) and/or switches (not shown) that are adapted to sequentially deliver transmitter signals to one or more of the transmitter electrodes at a time.

In one embodiment, as shown in FIG. 2B, the sensor processor 256 comprises a plurality of receiver channels 275 (e.g., receiver channels $275_1$, $275_2$, ... $275_N$) that each have a first input port 241 (e.g., ports $241_1$, $241_2$, ... $241_N$) that is configured to receive the resulting signal received with at least one receiver electrode (e.g., sensor electrode $211_1$, $211_2$, ... $211_N$), a second input port (e.g., ports $242_1$, $242_2$, ... $242_N$) that is configured to receive a reference signal delivered through the line 225, and an output port coupled to the analysis module 290 and electronic system 150. Typically, each receiver channel 275 is coupled to a single receiver electrode. Each of the plurality of receiver channels 275 may include a charge accumulator 276 (e.g., charge accumulators $276_1$, $276_2$, ... $276_N$), supporting components 271 (e.g., components $271_1$, $271_2$, ... $271_N$) such as demodulator circuitry, a low pass filter, sample and hold circuitry, other useful electronic components filters and analog/digital converters (ADCs) or the like. The analog/digital converter (ADC) may comprise, for example, a standard 8, 12 or 16 bit ADC that is adapted to receive an analog signal and deliver a digital signal (receiver channel output signal) to the analysis module 290 (e.g. a Successive Approximation ADC, a Sigma-Delta ADC, an Algorithmic ADC, etc). In one configuration, the charge accumulator 276 includes an integrator type operational amplifier (e.g., Op Amps $A_1$-$A_N$) that has an integrating capacitance $C_{fb}$ that is coupled between the inverting input and the output of the device. Due to the type of electronic elements required to detect and process the received resulting signals, the cost required to form the each receiver channel 275 is generally more expensive than the cost required to form the components in the signal generating processor 255 that provides the transmitter signal(s) to a transmitter electrode(s).

FIG. 3A is a table that lists examples of various different sensing electrode connection configurations that can be used to form an array of transcapacitive sensing elements that are used to sense the positional information of an input object that is positioned over at least a portion of the array. Each row of the table contains a different sensing electrode configuration that can be advantageously used in one or more of the embodiments described herein. FIG. 3B schematically illustrates the first sensing electrode configuration found in the table shown in FIG. 3A (e.g., first row of the table), which has one transmitter electrode 312 (or transmitters Tx) and twelve receiving electrodes 311 (or receivers Rx) that are used to detect the positional information of an input object disposed over the array 310 of sensing elements. In this configuration, each of the receiving electrodes 311 can be separately poled by a sensor controller 218 (FIG. 2A) by use of its dedicated trace 304 (e.g., 12 traces are shown in FIG. 3B) when a transmitter signal is delivered through the transmitter electrode 312 via its dedicated trace 303. Each of the receiving electrodes 311 and traces 304 and transmitter electrode 312 and trace 303 may be coupled to one or more components in the processing system 110, such as the sensor controller 218. The traces 303 and 304 are generally similar to the traces 212 and 213, respectively, which were discussed above. In this way, each receiving electrode 311 and at least an adjacently positioned portion of transmitter electrode 312 form a sensing element 121 (FIGS. 1 and 2A) that can be used to determine the positional information of an input object by knowing the position of each sensing element 121 in the array 310. Therefore, to control the electrodes 311, 312 in the array 310 it will require 13 total traces, which are illustrated as a group of traces 305A. One skilled in the art will appreciate that FIG. 3B can also be used to illustrate the sixth configuration disclosed in the table (e.g., 12 transmitters and 1 receiver) by swapping the function of the electrodes 311 and 312 from receiver electrodes to transmitter electrodes and transmitter electrode to receiver electrode, respectively. One will note that the capacitive coupling between electrodes is typically symmetric in most materials.

FIG. 3C schematically illustrates the fourth sensing electrode configuration found in the table shown in FIG. 3A, which has four transmitter electrodes 312 and three receiving electrode elements 311A-311C that are all used to detect the positional information of an input object disposed over the array 310 of sensing elements illustrated in FIG. 3C. In this configuration, each of the receiving electrode elements 311A, 311B and 311C can be separately polled by a sensor controller 218 by use of its dedicated trace 304 (e.g., 3 traces are shown in FIG. 3C) when a transmitter signal is delivered through one of the transmitter electrodes 312 via its dedicated trace 303. Since the receiving electrode elements 311A, 311B and 311C each comprise multiple interconnected sensor electrode elements, the sensing region 120 still contains the same number of sensing elements 121 as the configuration shown in FIG. 3B. Each of the interconnected sensor electrode elements, or sometimes referred to herein as a sub-receiver electrode elements (e.g., four shown for each receiving electrode 311A, 311B and 311C in FIG. 3C), within its respective receiving electrode element 311A, 311B or 311C will form a sensing element 121 with its adjacent transmitter electrode. In this example, the first sensor electrode element in the receiving electrode elements 311A, which is adjacently positioned relative to the top transmitter electrode 312 in FIG. 3C, forms one sensing element 121, and the other receiving electrode elements 311A that is adjacently positioned relative to the second transmitter electrode 312 from the top in FIG. 3C will also form another sensing elements 121, and so on for the other receiving electrodes and transmitting electrodes. One skilled in the art will appreciate that FIG. 3C can also be used to illustrate the third configuration disclosed in the table (e.g., 3 transmitters and 4 receiver) by swapping the function of the electrodes 311 and 312 from receiver electrodes to transmitter electrodes and transmitter electrode to receiver electrode, respectively. However, to control the electrodes 311, 312 in the array 310 shown in FIG. 3C it will only require 7 total traces, which are contained in the group of traces 305B. In the simple example illustrated in FIG. 3C, the total number of traces can be can be reduced by about 46% from the configuration illustrated in FIG. 3B.

The benefit of reducing the number of traces used in an input device is generally important in reducing the complexity and cost of the input device, since the sensing region 120 of most typical 3 inch up to 15 inch diagonal handheld devices today, such as a tablet, PDA or other similar device, require hundreds or even thousands of sensing elements 121 to reliably sense the position of one or more input objects, such as fingers. The reduction in the number of traces that need to be routed to the various processing system 110 components is desirable for a number of reasons, which include a reduction in the overall cost of forming the input device 100, a reduction in the complexity of routing the multitude of traces 303 and 304 within the sensing region 120, a reduced interconnecting trace length due to reduced routing complexity, a reduction in the cross-coupling of signals between adjacently positioned traces, and allowing for a tighter packing or increased density of electrodes 311 and 312 within the sensing region 120. The reduction in the number of traces will also reduce the amount of cross-coupling between the traces due to a reduction in the required trace density and number of traces that will transmit or receive signals delivered to or from adjacently positioned sensor electrodes or traces. Thus, one or more of the embodiments described herein, utilizes one or more of the techniques and electrode array configuration disclosed herein to reduce or minimize the number of traces and/or electrodes required to sense the position of an input object within the sensing region 120. Reducing the number of electrodes may allow designs that significantly reduce cost and complexity to be created, even when a larger number of receiver electrodes are required.

Moreover, one skilled in the art will appreciate that input device 100 configurations that utilize a greater number of transmitter electrodes versus receiver electrodes may be desirable, due to a reduction in the system complexity and system cost created by the difference in the components required to generate the transmitter signals delivered by the transmitter electrodes versus the components required to receive and process the resulting signals received by each receiver channel from a receiver electrode. Referring to FIG. 2B, the receiver channels 275 may include a charge accumulator 276 and supporting components 271, such as demodulator circuitry, a low pass filter, sample and hold circuitry, other useful electronic components filters and analog/digital converters (ADCs), while the transmitter signals can be created and delivered by use of a signal generator 220 and one or more shift registers and/or simple electrical switches. Therefore, in some embodiments, the number of transmitter electrodes is greater than the number of receiver electrodes, such as the configurations 4-6 listed in the table found in FIG. 3A. However, in some high speed or narrow bandwidth capacitive sensing applications it may be desirable to have a larger number of receiver electrodes versus transmitter electrodes, and thus some of the embodiments described herein can be used to reduce the total number of transmitter electrodes, required to reliably determine the positional information of an input object, relative to the number of required receiver electrodes.

While the discussion above and below generally describes an electrode (e.g., sensor electrodes 301, 311, 302, 312, etc.) as being a separate element from its dedicated trace (e.g., traces 303 and 304), the separation of these elements is only made for clarity reasons, since each "sensor electrode" or "electrode" will generally include a trace and a sensor electrode element (e.g., body portion of a sensor electrode). In some configurations, a trace may also contain connecting elements that are used to interconnect multiple sensor electrode elements together to form a sensor electrode, such as the interconnecting trace elements 304A that are each used to connect the receiving electrode elements 311A together, as illustrated in FIG. 3C. One skilled in the art will appreciate that each trace has a physical size that allows the delivered transmitter signals and/or received resulting signals to be transmitted from the sensor electrode element portion of the sensor electrode to the various processing system 110 components. Thus, each trace has a length and a cross-sectional area, which is defined by its thickness multiplied by its width, which both can be adjusted to assure that the resistance of this interconnecting component does not cause significant variation in the transmission or receipt of the capacitive sensing signals by the processing system 110 components. In some configurations the cross-sectional area of each trace is adjusted to compensate for the different lengths of the traces to assure that the resistance loss for each electrode is similar, no matter how close or far the electrode is from the various processing system components.

FIGS. 4A-17B each illustrate the various configurations of sensing electrodes that can be used in conjunction with the processing system 110 components discussed above to determine the positional information of an input object that is disposed within the sensing region 120. In general, the sensor electrode configurations illustrated in FIGS. 4A-4K, 5A-5C, 8 and 14 include a plurality of sensor electrodes that are configured to form a sensor electrode array (e.g., sensor electrode array 210, 310A-310K, 510A-510K, etc.) that can be used as part of a larger sensor array set (e.g., sensor array set 200, 600, 650, 700, 900A, 900B, 1000, etc.), which is used to sense the positional information of an input object that is disposed within the sensing region 120 of an input device 100. While the sensor electrode configurations illustrated in FIGS. 4A-17B contain many different numbers of sensor electrodes, these illustrations are not intended to limiting as to the scope of the invention described herein, since other numbers of each type of sensor electrode may be included without deviating from the basic scope of the invention described herein. The sensing electrodes can be disposed in an array of sensing electrodes, such as, for example, the sensing electrode arrays 310A-310K in FIGS. 4A-4K, sensing electrode arrays 510A-510C in FIGS. 5A-5C and sensing electrode array 810 in FIG. 8, which in some cases may be positioned in larger sensor array sets that include arrays of sensing electrodes, such as the sensor array sets shown in FIGS. 4J-4K, 6A-6B, 7, 9A-9B, 10, 11A, 12A-12B, 13, 15, 16A and 17A. Embodiments of the invention can be used to create a capacitive image using only sensor electrodes in a single layer disposed on a surface of a substrate. In some embodiments, no sensor electrodes are layered or jumpered within the sensing region 120, which is used for capacitive sensing. The sensor electrodes described herein can, for example, be formed by patterning a blanket conductive layer comprising a thin metal layer (e.g., copper, aluminum, etc.) or a thin transparent conductive oxide layer (e.g., ATO, ITO, AZO) that is deposited on a surface of an optically clear substrate (e.g., glass), or in some cases optically opaque substrate, using convention deposition techniques known in the art (e.g., PVD, CVD, evaporation, sputtering, etc.).

FIGS. 4A and 4B each illustrate a portion of a sensor electrode pattern, or array of sensor electrodes 310A and 310B, respectively, that may be used to form a single layer capacitive imaging sensor. FIG. 4A illustrates a plurality conductive routing traces, where sensor electrodes 301 and 302A-302E are coupled to processing system 110 through one of the traces 303 and 304. As is illustrated, a sensor electrode 301 may be patterned around a plurality of sensor electrodes 302A-302E. In various embodiments, the traces 303 and/or 304 may all be routed to one side of sensor electrode pattern as illustrated in FIG. 4B or to different sides as illustrated in FIG. 4A, or in any other alternating or non-alternating pattern as desired. In some input device configurations, it is desirable to route the traces 303 and/or 304 to different sides of an array of sensor electrodes 310A, as illustrated in FIG. 4A, to assure that multiple arrays of sensor electrodes 310A (see FIG. 6A) can be closely spaced together and reduce the possibility that electric fields created by the signal transmission through the traces (e.g., traces 303) will affect the measured resulting signal received by one or more of the electrodes found in an adjacently positioned array of sensor electrodes. In various embodiments the number of sensor electrodes may be adjusted to achieve a desired capacitive sensing resolution, pixel response and/or size of the sensor. The term "size" of an electrode or trace, as used herein, is generally intended to signify the difference in surface area of the electrode that is parallel to the surface that the electrode or trace is positioned on, since the thickness of the material used to form the electrodes and/or traces is typically small compared to the electrode's or trace's dimensions parallel to the surface on which it is positioned, and will remain relatively constant across the entire sensing region 120.

One skilled in the art will appreciate that the size of each type of electrode (i.e., transmitter or receiver) and the ratio (R) of the sizes of the electrodes (e.g., R=transmitter electrode surface area/receiver electrode surface area) will have an affect on the capacitive sensing characteristics of the processing system 110. In many configurations, it is desirable to adjust the areas of the transmitter and receiver electrodes so that they are not equal, and thus the ratio of the areas is much greater than or much less than unity (e.g., R>>1 or R<<1). In some embodiments, sensor electrodes that are configured as transmitter electrodes (e.g., sensor electrode 802A in FIG. 8) are sized so that an adjacent edge(s) (e.g., right side vertical edge) are at least as long as the sum of the adjacent edges of the adjacently positioned receiver electrodes (e.g., left side vertical edges of the sensor electrode elements 801A and 805A in FIG. 8).

In some embodiments, as illustrated in FIGS. 4A-7, the sensor electrode 301 may be patterned so that it can capacitively couple with each sensor electrode, such as the sensor electrodes 302 (e.g., sensor electrodes 302A-302E in FIG. 4A). In various embodiments, sensor electrodes 301 and 302 and the traces 303, 304 may comprise a similar material that is disposed over a surface of a substrate. In other embodiments, sensor electrodes 301 and 302 may comprise a first material and the traces 303, 304 may comprise a second material, wherein the first and second materials are different. In various embodiments, the sensor electrodes and conductive routing traces may comprise substantially transparent materials or substantially optically invisible materials such as Indium Tin Oxide (ITO), thin metal wires or the like.

In some cases, the sensor electrode 301 may be configured to perform as a transmitter electrode and sensor electrodes 302 may be configured to perform as receiver electrodes. In other cases, the sensor electrode 301 may be configured to perform as a receiver electrode and sensor electrodes 302 may be configured to perform as transmitter electrodes. In various embodiments, the processing system 110 is configured to simultaneously receive resulting signals from sensor electrodes 302 while transmitting a transmitter signal from the sensor electrode 301. In other embodiments, processing system 110 is configured to sequentially transmit transmitter signals through each of the sensor electrodes 302 while receiving resulting signals using the sensor electrode 301.

In one embodiment, as illustrated in FIG. 4A, sensor electrode 301 is patterned around each of the sensor electrodes 302A-302E. In some embodiments, the sensor electrode 301 is patterned in such a way that it at least partially encloses each of the sensor electrodes 302. The term "partially enclose," as used herein, is intended to describe a configuration where a portion of a first type of sensor electrode is disposed around a significant portion of the linear length of an edge or edges that define, or outline, the area of a second type of sensor electrode. In some embodiments, a first type of sensor electrode is said to partially enclose a second type of sensor electrode, where the first type of sensor electrode is disposed around the periphery of a second type of sensor electrode so that the centroid of the area of the second type of sensor electrode is at least disposed between opposing portions of the partially enclosing part of first type of electrode, while still allowing routing of the separate electrodes in a single layer. In one example, the sensor electrode 301 in FIG. 4G is said to partially enclose the sensor electrode 302A, since it is disposed around a significant portion of the sensor electrode 302A, so that the centroid of the area (not shown) of the sensor electrode 302A (triangular shaped electrode) is disposed between the top two segments of the sensor electrode 301, which are adjacent to two of the three edges of the sensor electrode 302A.

In one configuration, as shown in FIG. 4A, the sensor electrode 301 is designed to meander around and between the sensor electrodes 302A-302E, so that the conductive path that the electrode forms, between the connection side of the sensor electrode 301, which is coupled to the trace 304, and the furthest point away from the connection side (e.g., near sensor electrode 302A), winds back and forth around a central axis (e.g., a vertical axis of symmetry in FIG. 4A (not shown)) in which the array of sensor electrodes 310A are aligned. In some cases, as shown in FIG. 4A, the meander of the sensor electrode 301 may also wind around portions of each of the sensor electrodes 302A-302E to at least partially enclose each electrode. While a portion of the sensor electrode 301 is illustrated as being disposed between each adjacent pair of sensor electrodes 302A-302B, 302B-302C, etc. in FIG. 4A, this configuration is not intended to be limiting, since the meander of the sensor electrode 301 need not pass between each pair of adjacent sensor electrodes 302A-302B, etc. and may only pass between one of the adjacently positioned pairs in the sensor electrode array 310A. Moreover, in some configurations it may be desirable to maximize the length of the sensor electrode 301 to improve its sensitivity in receiving or transmitting a capacitive sensing signal between one or more of the adjacently positioned sensor electrodes 302A-302E. The sensor electrode 301 may be similar in size to the trace 304 and comprise the same material as the material used to form each sensor electrode element 302A-302E (e.g., layer of ITO), and thus may be formed during the patterning process used to form the sensor electrode elements.

In one embodiment, as illustrated in FIG. 4A, the sensor electrode array 310A includes a first type of sensor electrodes, such as sensor electrodes 302A-302E that have a first sensor electrode shape (e.g., polygonal shape), that are at least partially enclosed by a second type of sensor electrode that has a second sensor electrode shape (e.g., wire shaped), which is different than the first sensor electrode shape. In one configuration, the sensor electrode array 310A includes sensor electrodes 302A-302E that have a polygonal shape, and are at least partially enclosed by a second type of sensor electrode 301 that has a shape that outlines the polygonal shape of the sensor electrodes 302A-E. A shape of a sensor electrode that is spaced a repeatable or common distance from, or outlines, at least a portion of another sensor electrode is also defined herein as an electrode that has a complementary shape, or is a complementary shaped electrode. As shown in FIG. 4A, the sensor electrode 301 may have a complementary shape, which is rectangular, that outlines the rectangular shaped sensor electrodes 302A-E. Further, as shown in FIG. 4A, the sensor electrode 301 may have a meandering shape that has a differing orientation for each of the one or more of the adjacently positioned sensor electrodes 302A-302E. For example, the uppermost portion of the sensor electrode 301 has a C-shaped orientation that outlines the sensor electrode 302A, and the adjacent portion of the sensor electrode 301 has an inverted C-shaped orientation (e.g., inverted horizontally) that outlines the sensor electrode 302B.

In one embodiment, the sensor electrode 301 is patterned in such a way that it is disposed around pairs or larger groups of sensor electrodes, such as two or more sensor electrodes 302A-302E. Therefore, the array of sensor electrode configurations illustrated herein are not intended to be limiting as to the scope of the invention described herein, since the sensor electrode 301 can be disposed at least partially around two or more sensor electrodes without deviating from the basic scope of the invention described herein.

In another configuration, as illustrated in FIG. 4B, the sensor electrode 301 is formed so that the conductive path that the sensor electrode forms, between the connection side of the sensor electrode 301, which is coupled to the trace 304, and the furthest position away from the connection side (e.g., near sensor electrode 302A), is non-meandering and thus has a short path length (e.g., length of the portion of the electrode disposed on the left side of the sensor electrodes 302A-302E in FIG. 4B). As illustrated in FIG. 4B, the sensor electrode 301 has a complementary shape, which is rectangular, that outlines the rectangular shaped sensor electrodes 302A-E. Further, as shown in FIG. 4B, the sensor electrode 301 may have a shape that has the same orientation for one or more of the adjacently positioned sensor electrodes 302A-302E. For example, the uppermost portion of the sensor electrode 301 has a C-shaped orientation that outlines the sensor electrode 302A, and an adjacent portion of the sensor electrode 301 also has a C-shaped orientation that outlines the sensor electrode 302B. In some configurations it may be desirable to minimize the width of the sensor electrode 301 to reduce direct user input coupling to the electrode or increase the width to improve the RC time constant of the sensing device to allow for an increased capacitive sensing sampling rate (e.g., sensing frame rate).

FIG. 4C illustrates an array of sensor electrodes 310C that comprises a sensor electrode 301 that is patterned around the sensor electrodes 302A-302E, which each have a distributed electrode shape, such as a zig-zag wire shape as shown. The zig-zag wire shape can also be formed in a sinusoidal, stepped or other waveform type shape, including irregular wave type shapes. In some cases, use of a distributed electrode shape, as shown in FIG. 4C, may be preferred over a solid electrode shape, as shown in FIG. 4A, to adjust the ratio of the transmitter and receiver electrode areas by adjusting the sensor electrode area formed in the distributed electrode shape to improve the capacitive sensing sensitivity of the input device. In various embodiments, the distributed electrode shape type of sensor electrodes may be formed in various different shapes, orientations, designs and sizes. In one example, sensor electrodes 302A-302E, and their respective traces 303 may be comprised of the same materials and may have a similar cross-sectional size in its zig-zag wire shape. As illustrated in FIG. 4C, the sensor electrode 301 has a complementary shape, which is rectangular, that outlines the rectangular peripheral shape of the sensor electrodes 302A-E.

FIG. 4D illustrates an array of sensor electrodes 310D that comprises a segmented sensor electrode 301 that are each disposed around one or more of the sensor electrodes 302A-302E. The array of sensor electrodes 310D is similar to the array of sensor electrodes 310A illustrated in FIG. 4A, except that the sensor electrode 301 of FIG. 4A has been segmented so that groups of one or more sensor electrodes 302A-302E are at least partially enclosed in each of the formed segments 301A-301C. In this way, the different segments 301A-301C of the sensor electrode 301 can be separately polled at the same time or sequentially polled in time by the sensor controller components in the processing system 110. In one embodiment, as illustrated in FIG. 4D, the sensor electrode array 310D includes a first type of sensor electrodes, such as sensor electrodes 302A-302E that have a first electrode shape (e.g., polygonal shape), that are at least partially enclosed by a second type of sensor electrodes that have a second electrode shape (e.g., wire shaped).

FIG. 4E illustrates an array of sensor electrodes 310E that comprises an open circular or arc shaped sensor electrode 301 that is patterned around one or more of the circular sensor electrodes 302A-302C. FIG. 4F illustrates an array of sensor electrodes 310F that comprises an open hexagonal shaped sensor electrode 301 that is patterned around one or more of the hexagonal shaped sensor electrodes 302A-302B. As illustrated in FIGS. 4E and 4F, the sensor electrode 301 has a complementary shape, which is circular or hexagonal, that outlines the circular or hexagonal shaped sensor electrodes 302A-E. The configurations of the traces 303 and 304 in FIGS. 4E and 4F are not intended to limiting, and thus can be oriented in any other desirable orientation. In some embodiments, a group of several arrays of sensor electrodes 310E or 310F (not shown), or sensor array set, may be positioned and oriented so that the adjacently positioned arrays of sensor electrodes 310E or 310F form a hexagonal close-packed pattern across the sensing region 120 to improve the density of the sensing electrode pattern.

FIG. 4G illustrates an array of sensor electrodes 310G that comprises a triangular shaped sensor electrode 301 that is disposed between and/or patterned around a portion of one or more of the triangular shaped sensor electrodes 302A-302B. The array of sensor electrodes 310G, shown in FIG.

4G, includes a configuration in which the sensor electrode 301 is disposed adjacent to two edges of each of the sensor electrodes 302A-302C. As noted above, the sensor electrode 301 in FIG. 4G partially encloses the sensor electrode 302A, since it is disposed around a significant portion of the sensor electrode 302A. In one embodiment, the sensor electrode array 310G includes sensor electrodes 302A-302E, which have a triangular electrode shape, that are at least partially enclosed by a zig-zag or other similar shaped electrode that is disposed between the sensor electrodes 302A-302E. As illustrated in FIG. 4G, the sensor electrode 301 has a complementary shape that outlines at least a portion of the sensor electrodes 302A-E.

FIG. 4H illustrates an array of sensor electrodes 310H that comprises a sensor electrode 301 that is patterned around one or more complex shaped sensor electrodes 302A-302D. As illustrated in FIG. 4H, the sensor electrode 301 has a complementary shape that outlines at least a portion of the sensor electrodes 302A-D. FIG. 4I illustrates an array of sensor electrodes 310I that comprises a sensor electrode 301 that is disposed within one or more of the sensor electrodes 302A-302D. Since the capacitive coupling between adjacently positioned sensor electrodes is generally governed by the length of the adjacent edges of each of the sensor electrodes in each sensing element 121, it is often desirable to maximize the length of the adjacent edges of the sensor electrodes to maximize the capacitive coupling between the sensor electrodes. FIGS. 4H and 4I each generally illustrate sensor electrode configurations that interleave, or are interdigitated with each other in hopes of maximizing the length of the adjacent edges of the sensor electrodes to improve the capacitive coupling between the electrodes.

Figure 4K:
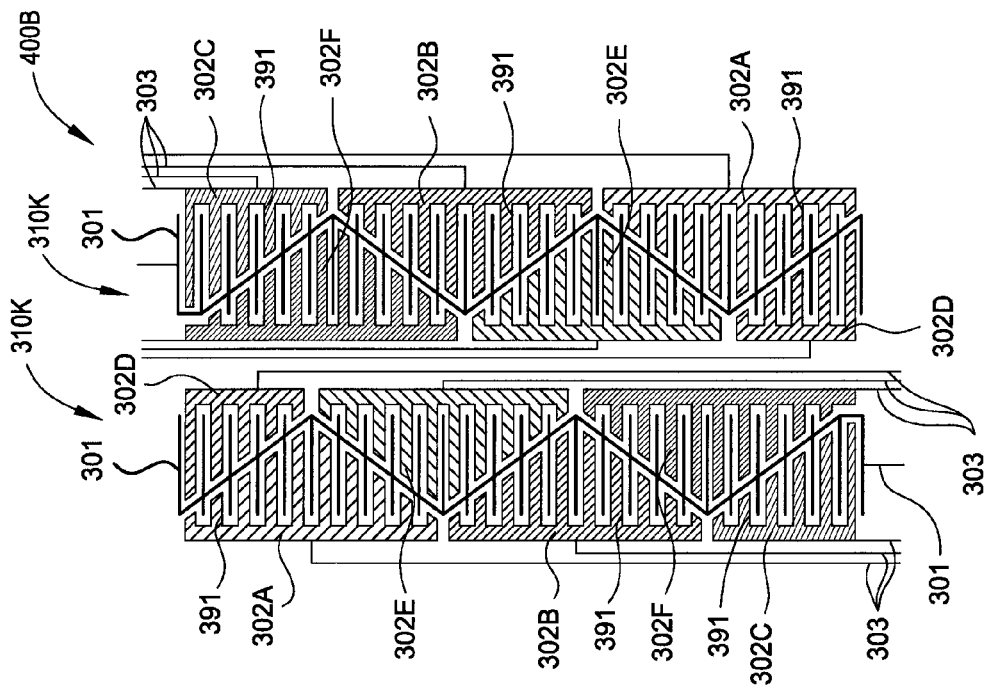
Figure 4J:
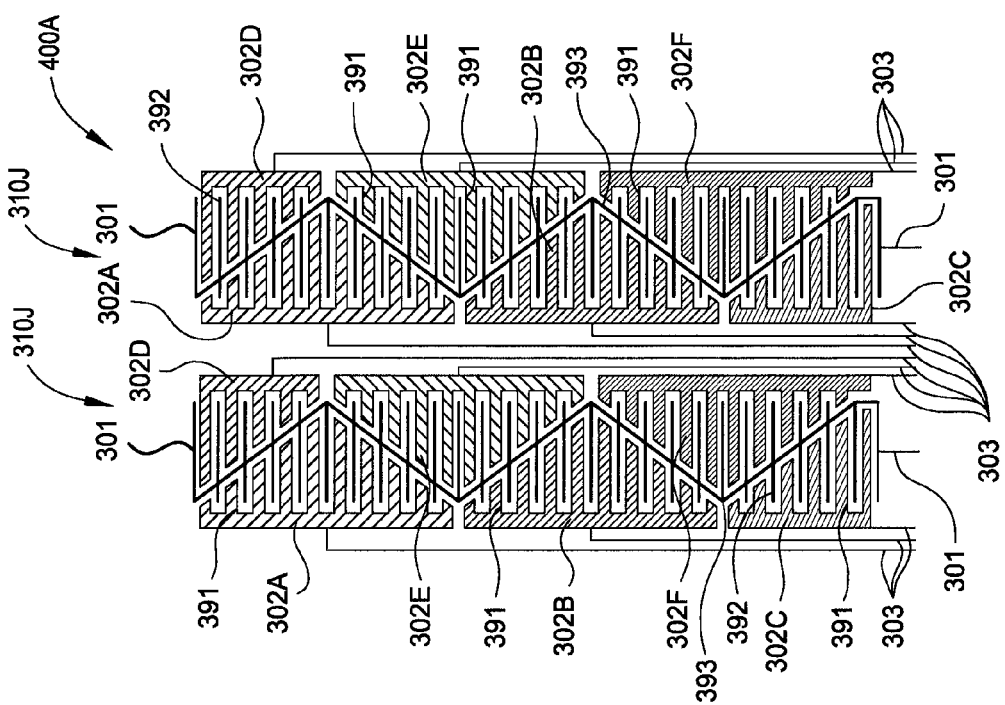

FIGS. 4J and 4K each illustrate a sensor array set 400J, 400K, respectively, that include sensor electrode arrays 310J, 310K, that each comprises a sensor electrode 301 that is disposed within one or more polygonal shaped sensor electrodes 302A-302D. FIG. 4K differs from FIG. 4J in that the traces 303 and 304 in one of the array of sensor electrodes 310K has been altered to change the symmetry of the electric fields and/or capacitive coupling generated across a portion of the sensing region 120. In some configurations, one or more of the sensor electrode arrays can be formed in other orientations to alter the position or routing of the sensor electrodes in adjacent sensor electrode arrays (e.g., mirror image of the sensor electrodes 301 and 302A-D in adjacent sensor electrode arrays) to alter the electric fields formed by the sensor electrodes in the sensor electrode arrays within a sensor array set. Therefore, FIGS. 4J and 4K each illustrate another possible sensor electrode configuration that has sensor electrodes that interleave, or are interdigitated with, each other to maximize the length of the adjacent edges of the sensor electrodes to improve the capacitive coupling between the electrodes. This can optimize the ratio of user input signal relative to the direct coupling (e.g. of interference) of an input into either electrode. In one embodiment, as illustrated in FIGS. 4I, 4J and 4K, the sensor electrode array 310I-K includes a first type of sensor electrodes, such as sensor electrodes 302A-302F that each have a first electrode shape (e.g., polygonal shape) that includes a plurality of recessed regions 391 in which a portion of a second type of sensor electrode (e.g., sensor electrode 301) is disposed. In general, the gap formed between the edge of the first type of sensor electrodes and the second type of sensor electrodes in the recessed region 391 is small enough to assure ohmic isolation and sized to achieve a desirable capacitive coupling between the sensor electrodes. In one example, as shown in FIG. 4J the sensor electrode 301 has a back-bone shape that includes a plurality of fingers 392, which are arrayed in a pattern and are interconnect by one or more connecting segments 393.

Figure 5C:
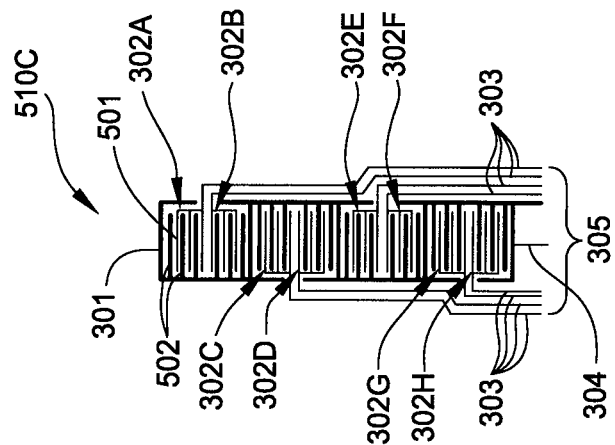
FIGS. 5A-5C are each schematic diagrams illustrating a plurality of sensor electrodes that are positioned to form an array of sensor electrodes, according to one or more of the embodiments described herein.
Figure 5B:
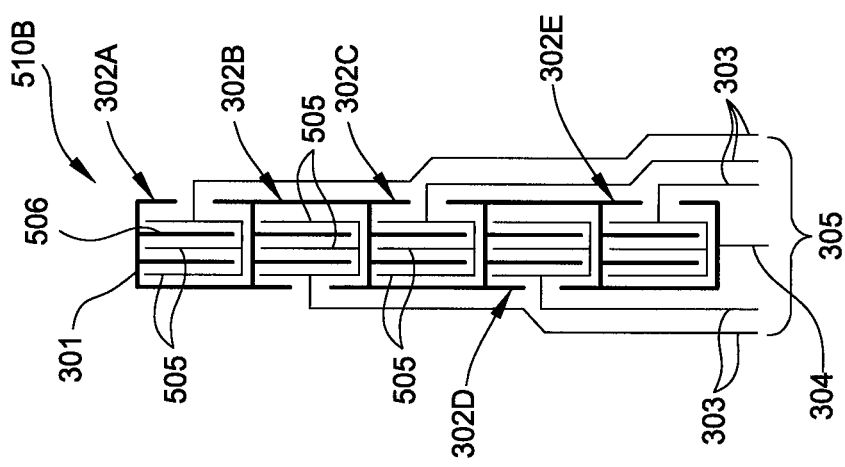
Figure 5A:
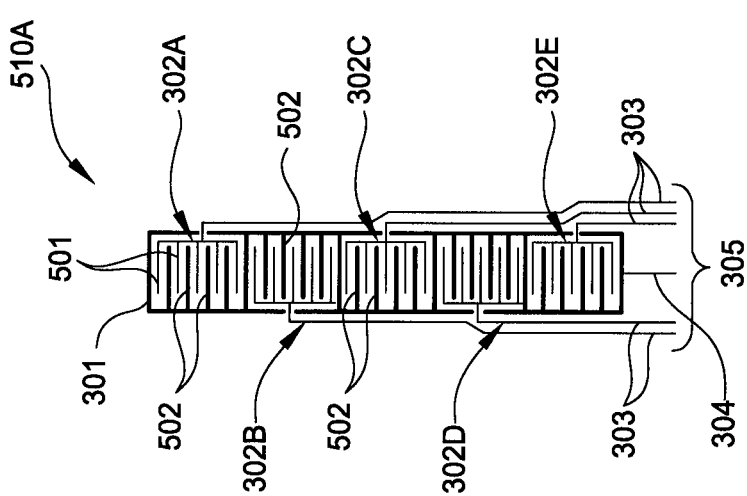

FIG. 5A illustrates an alternative embodiment of a of sensor electrode array 510A that includes a plurality of sensor electrodes 301 and 302A-302E of a single layer capacitive sensor device that are positioned to form interdigitated sensor electrodes. In the illustrated embodiment, sensor electrode 301 is interdigitated with sensor electrodes 302A-302E, such that one or more electrode segments 501 of each of the sensor electrodes 302A-302E and electrode segments 502 of each of the one or more sensor electrode(s) 301 overlap in at least one direction (e.g., horizontal direction in FIG. 5A). In one configuration, as illustrated in FIG. 5A, the sensor electrode 301 has a meandering configuration that also includes the sensor electrode 301 that at least partially encloses each of the sensor electrodes 302A-302E. The meandering configuration may also include a sensor electrode 301 that weaves between one or more the adjacent sensor electrodes 302A-E, as well as at least partially enclosing one or more of the sensor electrodes 302A-302E This sensor electrode configuration will tend to maximize the length of the adjacent edges of the sensor electrodes 301 and 302 to improve the capacitive coupling between each pair of sensor electrodes in each sensing element 121 (e.g., sensor electrode 302A and a portion of sensor electrode 301).

In other embodiments, the sensor electrodes 301 and 302 may be interdigitated or interleaved in various other orientations. FIG. 5B illustrates an array of sensor electrodes 510B. In one example, while the embodiment illustrated in FIG. 5A illustrates a horizontal orientation of the interdigitated electrode segments 501 and 502, in other embodiments a vertical orientation, such as the interdigitated electrode segments 506 and 505 of the sensor electrodes 301 and 302, respectively, may be used. Therefore in one embodiment, sensor electrode 301 is interdigitated with sensor electrodes 302A-302E, such that one or more electrode segments 505 of each of the sensor electrodes 302A-302E and electrode segments 506 of each of the one or more sensor electrode(s) 301 overlap in one direction (e.g., vertical direction in FIG. 5B). One skilled in the art will appreciate that other orientations of the interdigitated electrodes may be used.

FIG. 5C illustrates another embodiment of an interdigitated single layer sensor electrode pattern, or array of sensor electrodes 510C. In this illustrated embodiment, a sensor electrode 301 is interdigitated with sensor electrodes 302A-302H. As compared to the embodiment of FIG. 5A, in the embodiment illustrated in FIG. 5C, two different sensor electrodes 302 are interdigitated with a portion of sensor electrode 301, whereas a single sensor electrode 302 is interdigitated with that same portion of sensor electrode 301 in the embodiment illustrated in FIG. 5A. In other embodiments, more than two sensor electrodes 302 may be interdigitated with each portion of sensor electrode 301.

FIG. 6A schematically illustrates a sensor array set 600, which may comprise two or more sensor electrode arrays 610. In one example, as shown in FIG. 6A, the four sensor electrodes arrays 610 are disposed within a sensing region 120 to determine the positional information of an input object by use of a capacitive sensing technique. The sensor electrode arrays 610 may be similar to the sensor electrode array 310A illustrated in FIG. 4A, as shown, or in any other similar sensor array configuration as shown in FIGS. 4B-4K and 5A-5B or variants thereof. In various embodiments, each of the traces 303 and 304 may be coupled to the sensor controller 218 (FIG. 2A) so that the sensors in the sensor array set can be driven for capacitive sensing. The traces 303 and 304 may form part of or replace the traces 212 and 213, respectively, discussed above in conjunction with FIGS. 2A-2B.

In one example, the sensor electrodes 302A-302E in the sensor electrode arrays 610 may be used as transmitter electrodes and the sensor electrodes 301 may be used as receiver electrodes. The input device containing the sensor electrode arrays 610 may be operated such that one transmitter electrode transmits at one time, or multiple similarly positioned transmitter electrodes transmit at the same time. In this example, multiple sensor electrodes 302A-302E in each sensor electrode array 610 transmit different transmitter signals according to one or more coding schemes that enable their combined effects on the resulting signals received by the receiving type sensor electrodes 301, to be independently determined. The receiver type sensor electrodes 301, may be operated singly or multiply to acquire resulting signals created from the transmitter signal to determine measurements of the capacitive couplings at the capacitive pixels, which are used to determine whether an input object is present and its positional information, as discussed above. The resulting signals may be received at one instant in time, or by scanning the each of the various sensing elements distributed across the sensing region 120 or other useful scanning technique.

FIG. 6B schematically illustrates a sensor array set 650, which comprises two or more sensor electrode arrays 610. The sensor array set 650 is similar to the sensor array set 600 shown in FIG. 6A, but includes a configuration that contains a shield electrode 670 and trace routing scheme that allows the interconnection of the various traces and external components to be made outside of the sensing region 120, such as in the external regions 661 and 662. To improve the manufacturability of the input device, reduce its manufacturing cost and improve its device yield it is desirable to eliminate the use of jumpers within the sensing region and route all of the traces so that the connections made to the external components can be made outside of the sensing region 120 and near the edge of the substrate on which the electrodes are formed.

As illustrated in FIG. 6B, the routing of the traces 303 and 304 exit two sides of the sensing region 120. While its generally desirable to have the traces be routed out a single side of the sensing region 120 for ease of forming connections with other external components and reducing the required overall size of the substrate (e.g., substrate 209 in FIG. 2A) on which the sensor electrodes are disposed, a two or more sided trace routing scheme may be needed as the density or pattern of the sensor electrodes in the sensor electrode arrays 610 or sensor array set 650 becomes more complex. While routing of the traces out of more than one side of the sensing region 120 is only illustrated in FIG. 6B, one skilled in the art will appreciate that any of the other configurations of sensor array sets or variations thereof may benefit from this type of trace routing configuration.

In the embodiment illustrated of FIG. 6B, the shield electrode 670 (or guard electrode) is disposed over portions of the surface on which the sensor electrodes 301 and 302A-302J are formed. The shield electrode 670, which are similarly labeled in the figures discussed below as reference numerals 770, 970, 1070, 1270, 1570 and 1670, is generally used to shield the sensor electrodes and associated conductive traces 303 and 304 from each other to prevent or minimize the cross-talk between adjacently positioned and closely spaced traces and/or sensor electrodes. The shield electrode 670 may be coupled to a substantially constant voltage such as system ground, or any other substantially constant voltage, or varying voltage, which is able to shield nearby sensor electrodes and traces from each other. In general, the shield electrode 670 is useful to help improve the coupling of the input object 140 (FIG. 1) to the input device's ground, and thus reduce the often large variability seen in the capacitive sensing measurements collected when the chassis of the input device 100, such as a cell phone, is not in sufficient electrical contact with the input object, such as the finger of the input device user. The shield electrode 670 may comprise one or multiple electrodes either coupled to one another or driven with a similar signal (e.g., system ground). In FIG. 6B, and other figures discussed herein, one or more portions of the shield electrode 670 may be coupled together in the external regions 661 and 662, and connected to an input device 100 system ground and/or chassis of the input device 100 by a trace 605. In various embodiments, the material from which the shield electrode is formed is the same as the material from which the sensor electrodes are formed, and thus in some embodiments, can be formed out of the same blanket layer of material during the sensor electrode patterning process. In various embodiments, the sensor electrodes, shield electrode(s) and conductive routing traces may comprise substantially transparent materials or substantially optically invisible materials such as Indium Tin Oxide (ITO), thin metal wires, metal layer or the like.

Figure 7:
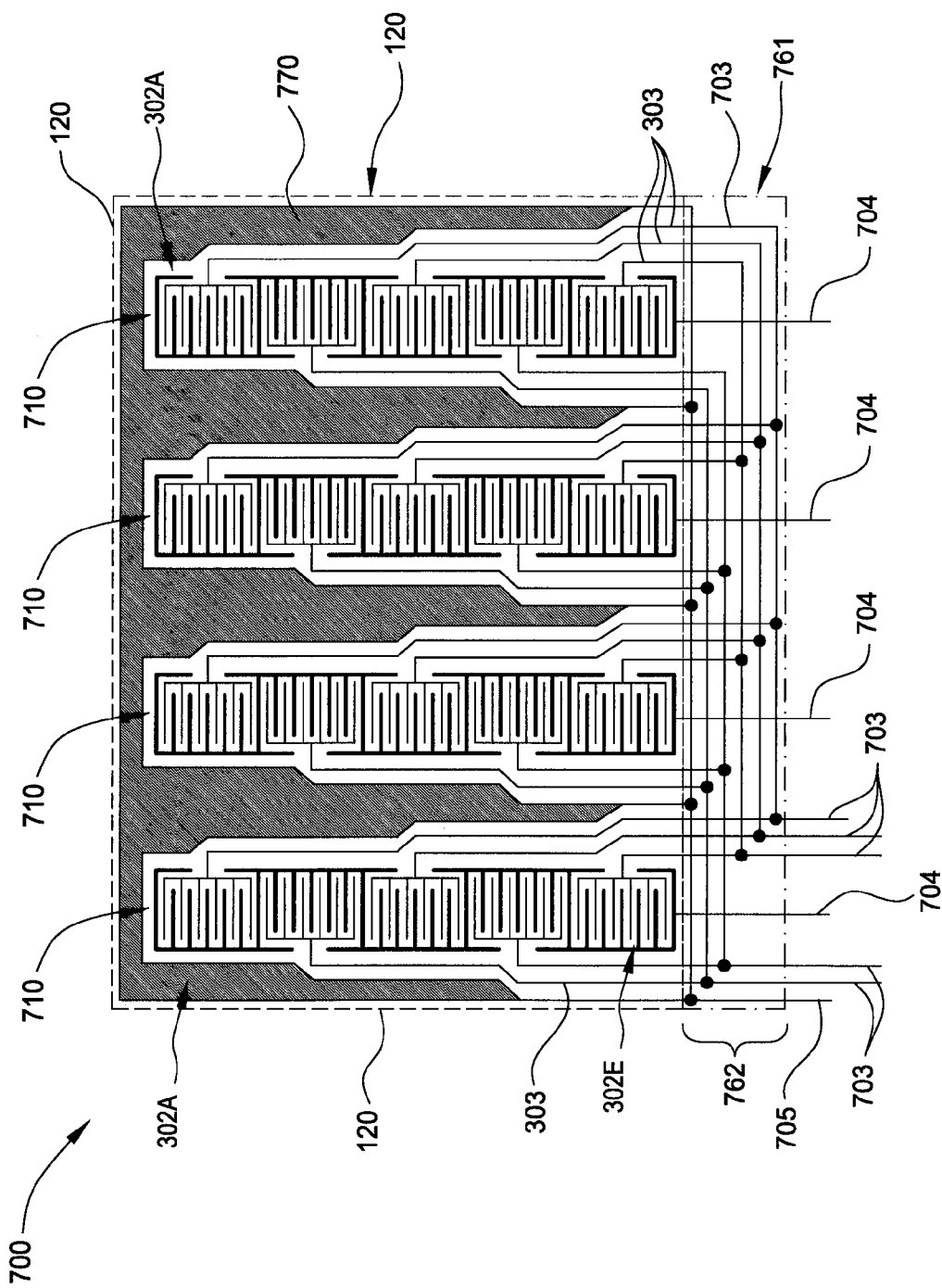
FIG. 7 is a schematic diagram illustrating a sensor electrode set that includes multiple arrays of sensor electrodes that each contain a plurality of sensor electrodes, according to one or more of the embodiments described herein.

FIG. 7 schematically illustrates a sensor array set 700, which comprises two or more sensor electrode arrays 710. In one example, as shown in FIG. 7, the four sensor electrodes arrays 710 are disposed within a sensing region 120 to determine the positional information of an input object by use of the various processing system 110 components that are discussed above. The sensor array set 700 is similar to the sensor array set 650 shown in FIG. 6B, but includes a sensor array similar to the configurations shown in FIG. 5A. The sensor array set 700 also includes a shield electrode 770 and trace routing scheme that allows the interconnection of the various traces and external components to be made outside of the sensing region 120, such as in the external regions 762. In FIG. 7, the one or more components of the shield electrode 770 may be coupled together in the external regions 762, and also connected to a system ground and/or chassis of the input device 100 by a trace 705. In one example it is also possible to connect neighboring groups of electrodes 303 to different interconnection traces in the external region so that electrodes (e.g. transmitters) associated with neighboring receivers transmit at different times or polarities to reduce or detect total input coupling from the user input to those neighboring groups of electrodes.

FIGS. 8-17B illustrate various different configurations of sensor electrodes that generally comprise a plurality of sensor electrodes that are arranged in groups of adjacently positioned sensor electrodes that are combined to form an array of sensor electrodes that can be used to form a sensor electrode set. Each group of adjacently positioned sensor electrodes may contain two or more sensor electrodes that are used to form one or more sensing elements 121. In some embodiments, one or more of the sensor electrodes in a sensor electrode array may be used as a transmitter electrode and one or more of the other sensor electrodes may be used as a receiver electrode. In one example, the sensor electrodes 802A-802D in one or more of the sensor electrode arrays (e.g., sensor electrode arrays 810, 910A-D, 1010A-D, 1010A-D, 1110A-B, 1210A-D, 1310A-D, 1510A-D, 1610A-D and 1710A-D) may be used as transmitter electrodes and the sensor electrodes 801 and 805 may be used as receiver electrodes. The input device containing the sensor electrode arrays may be operated such that one transmitter electrode transmits at one time, or multiple similarly positioned transmitter electrodes transmit at the same time. In this example, multiple sensor electrodes 802A-802D in each sensor electrode array transmit the same or different transmitter signals. The receiver type sensor electrodes 801 and 805, may each be operated singly or multiply to acquire the resulting signals to determine measurements of the capacitive couplings at the capacitive pixels (e.g., sensing elements 121) to determine the positional information of an input object. The resulting signals may be received at one instant in time, or by scanning the rows and/or columns of sensing elements distributed across the sensing region 120 in a raster scanning pattern (e.g., serially polling each sensing element separately in a desired scanning pattern), row-by-row scanning pattern, column-by-column scanning pattern or other useful scanning technique.

Figure 8:
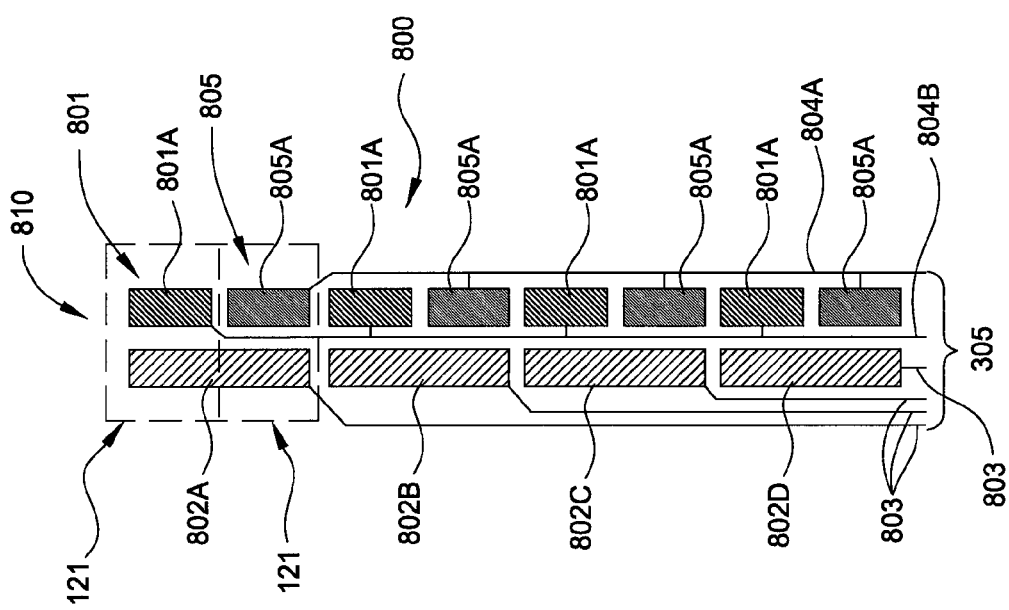
FIG. 8 is a schematic diagram illustrating a plurality of sensor electrodes that are positioned to form an array of sensor electrodes, according to one or more of the embodiments described herein.

FIG. 8 illustrates a sensor electrode array 810 that comprises a plurality of sensor electrodes that are arranged in groups of three adjacently positioned sensor electrodes, such as sensor electrodes 801, 805 and one of the sensor electrodes 802. In this configuration, each group of sensor electrodes is used to form two sensing elements 121, as shown at the top of FIG. 8. In the illustrated embodiment, sensor electrodes 802A-802D are individually coupled to a different trace 803, while sensor electrodes 801 and 805 comprise multiple sensor electrode elements 801A, 805A that are each coupled together through a common trace 804A and 804B, respectively. As illustrated in FIG. 8, a sensor electrode element 801A, 805A from each sensor electrode is disposed adjacent a different sensor electrode 802 (e.g., sensor electrodes 802A-802D) within the group. In other embodiments, each sensor electrode element 801A, 805A may be separately coupled to its own separate trace. In such embodiments, each of the sensor electrode elements may be configured to operate as individual sensor electrodes or as elements of larger sensor electrodes. Further, while the sensor electrode elements 801A, 805A are illustrated as being part of either the sensor electrode 801 or sensor electrode 805, in other embodiments the sensor electrode elements may be configured to form any number of sensor electrodes.

As described above, in relation to FIG. 2A, sensor electrodes 802A-802D may be configured to transmit transmitter signals and while sensor electrodes 801 and 805 (and related sensor electrode elements) may be configured receive the resulting signals formed from the transmitter signals. Alternately, sensor electrodes 801 and/or 805 may be configured to transmit transmitter signals, while sensor electrodes 802A-802D may be configured to receive the formed resulting signals.

As illustrated in FIG. 8, the sensor electrode elements 801A and 805A can each be coupled together, such that the top sensor electrode element in a portion of each group of sensor electrode elements are coupled together to form the sensor electrode 801 and the bottom sensor electrode element in the portion of the group of sensor electrode elements are coupled together to form the sensor electrode 805. In other embodiments, the sensor electrode elements may be coupled together in other desirable ways. For example, the bottom sensor electrode element adjacent to sensor electrode 802A may be coupled to the top sensor electrode element adjacent to sensor electrode 802B, and the bottom sensor electrode element adjacent to sensor electrode 802B may be coupled to the top sensor electrode element adjacent to sensor electrode 802C, Such a coupling pattern may continue throughout the sensor electrode pattern or it may be varied through the sensor electrode pattern.

In various embodiments, the number of traces may be reduced by nearly half, as compared with configurations that have one sensor electrode element for each trace. Further, the sensor electrode pattern illustrated in FIGS. 8-17B, may provide an improved signal to noise ratio and/or provide a capacitive pixel response that is wider which provides increased response to smaller input objects (e.g., smaller than 5 mm) over other more conventional designs. In other embodiments, the sensor electrode pattern of FIG. 8 may provide a connection between the sensor and processing system 110 with a reduced number of interconnecting vias in the flex (a reduction of about fifty percent) (i.e., reference numeral 251 in FIG. 2A). Further, the sensor electrode pattern of FIG. 8 may provide for an increased capacitive frame rate. As noted above, by use of one or more of the sensor electrode interconnecting schemes disclosed herein, the number of traces and/or electrodes required to sense the position of an input object within the sensing region can be reduced without affecting the accuracy and repeatability of the acquired positional data.

Figures 9A, 9B:
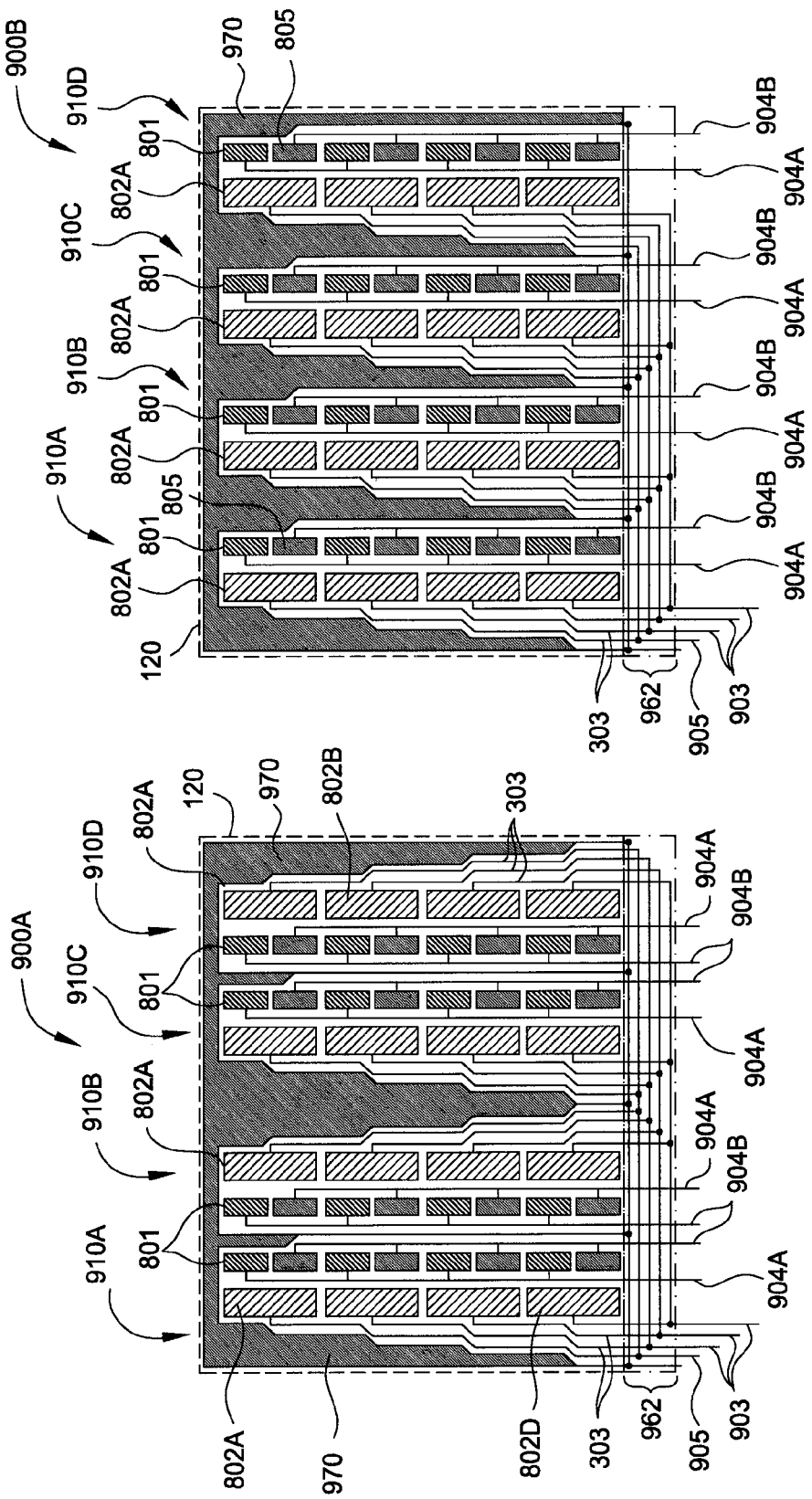
FIG. 9A is a schematic diagram illustrating a sensor electrode set that includes multiple arrays of sensor electrodes that each contain a plurality of sensor electrodes, according to one or more of the embodiments described herein.
FIG. 9B is a schematic diagram illustrating a sensor electrode set that includes multiple arrays of sensor electrodes that each contain a plurality of sensor electrodes, according to one or more of the embodiments described herein.

FIG. 9A schematically illustrates a sensor array set 900A, which comprises two or more sensor electrode arrays 910, such as sensor electrode arrays 910A-910D. FIG. 9B schematically illustrates another sensor array set configuration, or sensor array set 900B, which comprises two or more sensor electrode arrays 910. Each of the sensor electrode arrays 910A-910D in the sensor array sets 900A and 900B contain the sensor electrode array 810 shown in FIG. 8. The sensor electrode arrays 910A-910D in the sensor array set 900A are oriented so that the sensor electrodes 801 and 805 in adjacent sensor electrode arrays (e.g., sensor electrode arrays 910A and 910B) are positioned adjacent to each other, while the sensor electrode arrays 910A-910D in the sensor array set 900B are each oriented in the same direction. In some applications it may be desirable to orient sensor electrodes arrays so that the sensor electrodes of the same type, such as sensor electrodes 802 or sensor electrodes 801 and 805 are near to each other, such as shown in FIG. 9A, to reduce the cross-talk between sensor electrodes and their respective traces of the opposite type, such as illustrated in FIG. 9B.

The sensor array sets 900A and 900B may also include a shield electrode 970 and trace routing scheme that allows the interconnection of the various traces and external components to be made outside of the sensing region 120, such as in the external regions 962. The portions of the shield electrode 970 that are disposed between the sensor electrodes and their associated traces can help reduce the cross-talk between sensor electrodes, which may be especially useful for configurations that have sensor electrodes of opposing types adjacent to each other, such as shown in FIG. 9B. The one or more components of the shield electrode 970 may be coupled together in the external regions 962, and also connected to a system ground and/or chassis of the input device 100 by a trace 905.

Figure 10:
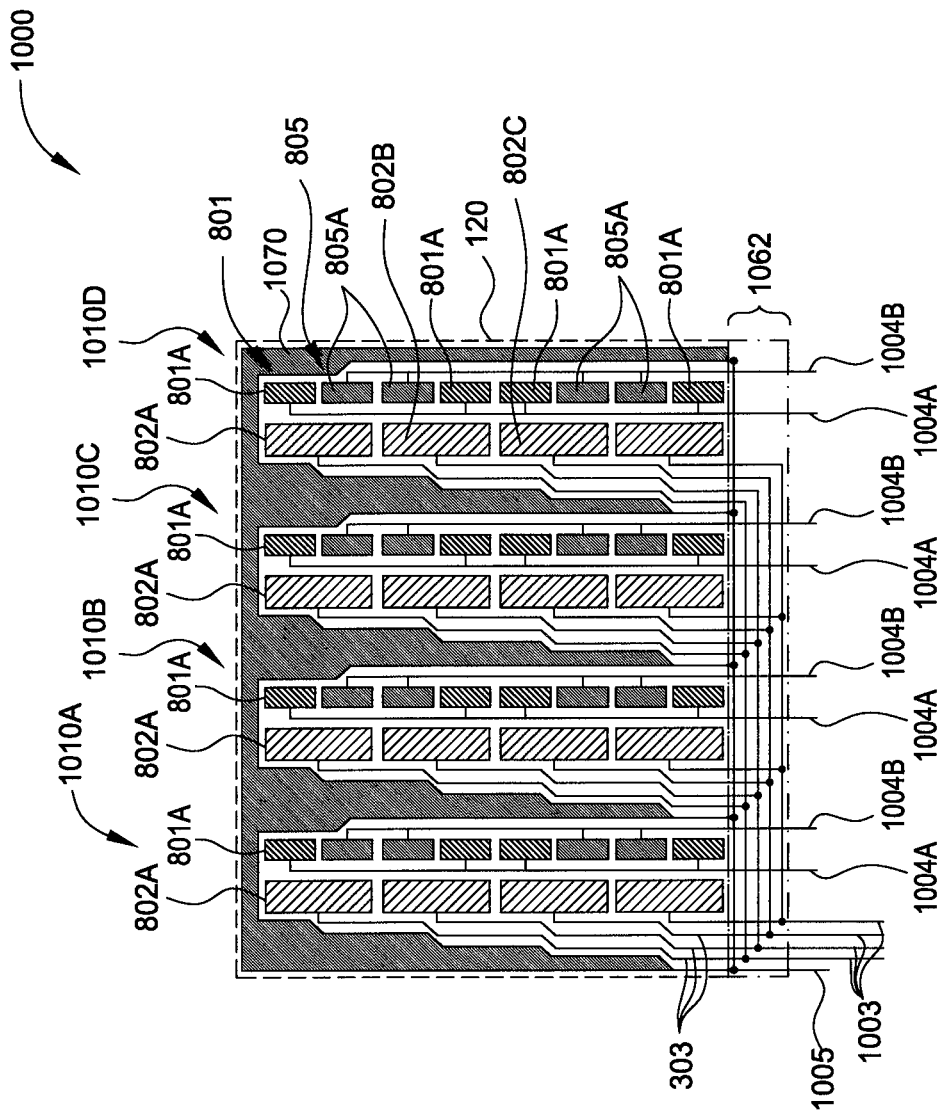
FIG. 10 is a schematic diagram illustrating a sensor electrode set that includes multiple arrays of sensor electrodes that each contain a plurality of sensor electrodes, according to one or more of the embodiments described herein.

FIG. 10 schematically illustrates a sensor array set 1000, which comprises two or more sensor electrode arrays 1010, such as sensor electrode arrays 1010A-1010D. Each of the sensor electrode arrays 1010A-1010D in the sensor array set 1000 are generally different from the sensor electrode array 810 shown in FIG. 8, since the sensor electrode elements 801A and 805A in each sensor electrode array are positioned so that the bottom sensor electrode element 805A, which is adjacent to a first sensor electrode (e.g., electrode 802A), is coupled to the top sensor electrode element 805A that is adjacent to a second sensor electrode (e.g., electrode 802B), and the bottom sensor electrode element 801A, which is adjacent to the second sensor electrode, may be coupled to the top sensor electrode element 801A that is adjacent to a third sensor electrode (e.g., electrode 802C), and so on, as is shown in FIG. 10. Such a coupling pattern of the sensor electrode elements may continue throughout the sensor electrode array or it may be varied through the sensor electrode pattern.

Therefore, in one example, a capacitive image sensor may comprise a first set of sensor electrodes comprising a first sensor electrode element 801A, a second sensor electrode element 805A and a third sensor electrode element 801A, and the first sensor electrode element 801A is electrically coupled to the third sensor electrode element 801A, and a second set of sensor electrodes comprising a fourth sensor electrode 802A and a fifth sensor electrode 802B, wherein the fourth sensor electrode 802A is configured to capacitively couple with the first sensor electrode element 801A, and the fifth sensor electrode 802B is configured to capacitively couple with the third sensor electrode element 801A. In the configuration illustrated in FIG. 10, the third sensor electrode element 801A is disposed between the first sensor electrode and the second sensor electrode. Whereas, in the configuration illustrated in FIG. 8, the second sensor electrode element 805A may be disposed between the first sensor electrode element 801A and the third sensor electrode element 801A.

The sensor array set 1000 may also include a shield electrode 1070 and trace routing scheme that allows the interconnection of the various traces and external components to be made outside of the sensing region 120, such as in the external regions 1062. The one or more components of the shield electrode 1070 may be coupled together in the external regions 1062, and also connected to a system ground and/or chassis of the input device 100 by a trace 1005.

FIG. 11A schematically illustrates a sensor array set 1100, which comprises two or more sensor electrode arrays, such as sensor electrode arrays 1110A-1110B. FIG. 11B is a close-up view of a few sensor electrodes that are positioned within the sensor electrode array 1110B, in the sensor array set 1100. In various embodiments, one or more of the sensor electrodes elements in a sensor electrode includes a grounded region 1130 (FIG. 11B) that is disposed within at least a portion of the sensor electrode element and is coupled to a ground trace 1120. The ground traces 1120 may be coupled together in an external region that is outside of the sensing region 120, and also be connected to a system ground and/or chassis of the input device 100. The grounded region 1130 may comprise a conductive layer that is ohmically isolated from the sensor electrodes 1101, 1102 or 1105. In one example, the grounded region 1130 is formed from a portion of the conductive layer that is patterned to form each of the sensor electrodes. In some configurations, one or more of the sensor electrode elements 1101A, 1102A-E, 1105A in one or more of the sensor electrodes 1101, 1102 or 1105 at least partially enclose a region that has a conductive layer disposed therein, and the conductive layer is coupled to a system ground and/or chassis of the input device 100. In one example, the grounded region 1130 is disposed within the center of a sensor electrode element, since this is a region of the sensor electrode element that provides or receives the smallest amount of capacitive sensing signal and thus will not dramatically alter the capacitive sensing measurement.

The addition of the grounded region 1130 within the sensor electrode element will reduce the size, or effective surface area, of the sensor electrode element. In general, the addition of the grounded region 1130 within one or more of the sensor electrode elements can be used to adjust the ratio of the electrode areas (e.g., low ground mass effect) between adjacent opposing electrodes, which is important for controlling the signal quality and reducing the variability in the signals received by the receiving electrodes. The addition of the grounded region 1130 within one or more of the sensor electrode elements is also useful to increase the size of the ground plane in the input device to improve the coupling of the input object to the ground plane to reduce the variability in the measure capacitive sensing signal created by variations in the coupling of the input object to the system ground. The addition of the grounded region 1130 within one or more of the sensor electrode elements will also reduce the amount of cross-talk between sensor electrodes in one or more sensor arrays by shunting the unwanted signals, and also reduce the unwanted effects of EMI.

Further, in one embodiment of the input device 100, each of the sensor electrode arrays 1110A-B comprise a plurality of sensor electrodes that are arranged so that each sensor electrode (e.g., sensor electrode 1102A-E) is associated with at least a portion of a sensor electrode element 1101A and 1105A of the sensor electrodes 1101, 1105. In this configuration, each group of sensor electrodes is used to form two sensing elements 121 (not shown), which is similar to the configuration shown at the top of FIG. 8. In the illustrated embodiment, sensor electrodes 1102A-1102E are individually coupled to a different trace 1103, while sensor electrodes 1101 and 1105 comprise multiple sensor electrode elements 1101A, 1105A that are each coupled together through a common trace 1104A and 1104B, respectively. As illustrated, a sensor electrode element 1101A, 1105A from each sensor electrode is disposed adjacent a different sensor electrode 1102 (e.g., sensor electrodes 1102A-1102E) within the group.

In other embodiments, each sensor electrode element 1101A, 1105A may be separately coupled to its own separate trace. In such embodiments, each of the sensor electrode elements may be configured to operate as individual sensor electrodes or as elements of larger sensor electrodes. Further, while the sensor electrode elements 1101A, 1105A are illustrated as being part of either the sensor electrode 1101 or sensor electrode 1105, in other embodiments the sensor electrode elements may be configured to form any number of sensor electrodes. As described above, in relation to FIG. 2A, sensor electrodes 1102A-1102E may be configured to transmit transmitter signals and while sensor electrodes 1101 and 1105 (and related sensor electrode elements) may be configured receive the resulting signals formed from the transmitter signals. Further, sensor electrodes 1101 and/or 1105 may be configured to transmit transmitter signals, while sensor electrodes 1102A-1102E may be configured to receive the formed resulting signals. In a further embodiment, the electrode region 1130 may be driven with a transmitter signal in a separate mode to be received by other electrodes (e.g. 1102, 1101, 1104) or the electrode may be electrically floated (e.g. ohmically disconnected) to affect the sensing in some modes, while it is grounded in others.

Figures 12A, 12B:
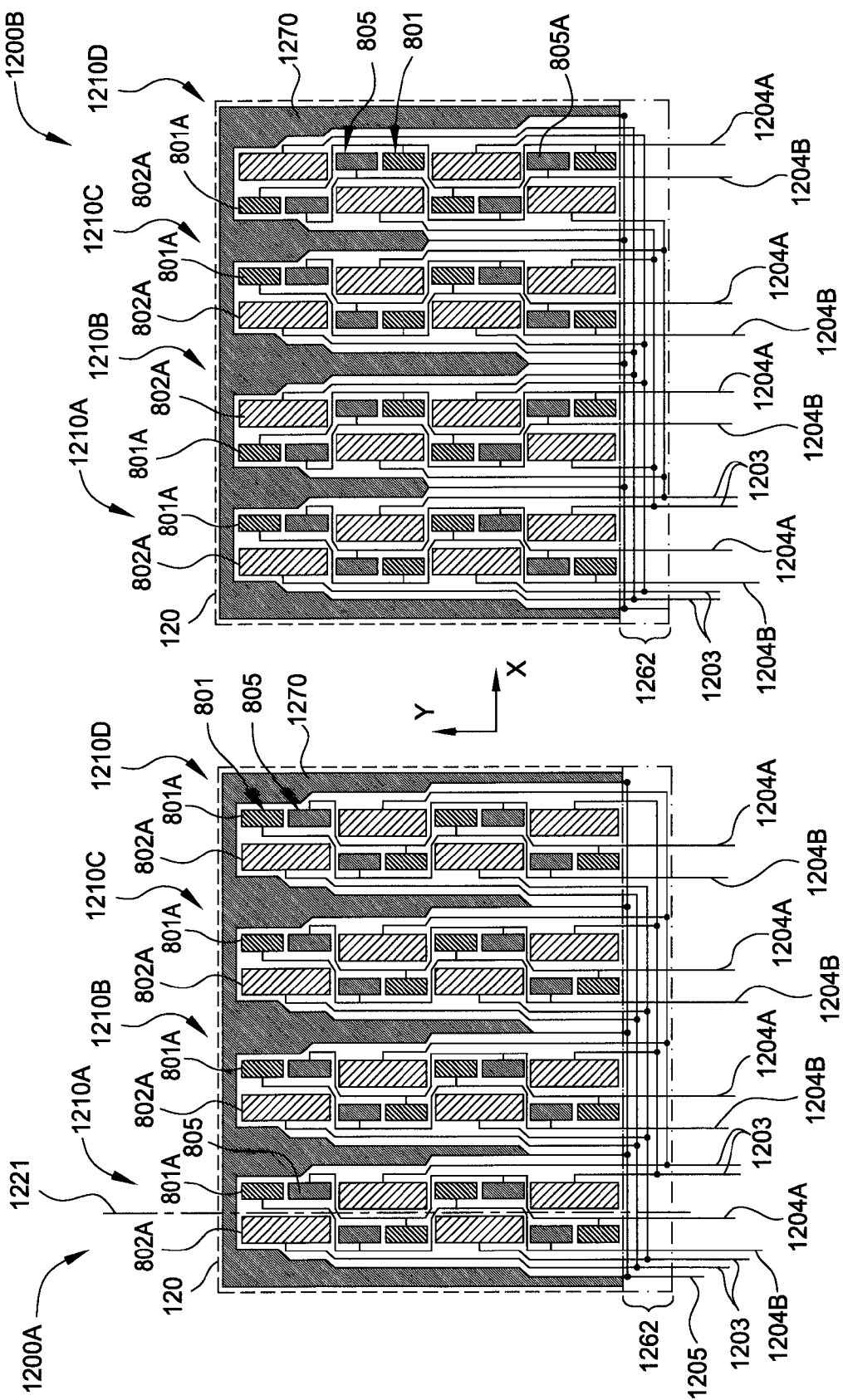
FIG. 12A is a schematic diagram illustrating a sensor electrode set that includes multiple arrays of sensor electrodes that each contain a plurality of sensor electrodes, according to one or more of the embodiments described herein.
FIG. 12B is a schematic diagram illustrating a sensor electrode set that includes multiple arrays of sensor electrodes that each contain a plurality of sensor electrodes, according to one or more of the embodiments described herein.

FIG. 12A schematically illustrates a sensor array set 1200A, which comprises two or more sensor electrode arrays 1210, such as sensor electrode arrays 1210A-1210D. FIG. 12B schematically illustrates another sensor array set configuration, or sensor array set 1200B, which comprises two or more sensor electrode arrays 1210. Each of the sensor electrode arrays 1210A-1210D in FIGS. 12A-12B comprise sensor electrodes 801, 802 and 805 that are arranged in a staggered or an alternating sensor electrode layout. As is illustrated, each of the sensor electrode arrays contain alternating rows that are flipped or formed in a mirror representation of the sensor electrode group found in an adjacent row that is above and below. It is believed that the staggered or an alternating sensor electrode layout may provide an improved capacitive sensing sensitivity, due to the alternating electric field formation direction between each adjacent group of sensor electrode elements. In one example, where sensor electrodes 802A is a transmitter electrode and the top sensor electrode elements 801A and 805A are receiving electrodes in sensor electrode array 1210A the electric field will be created from left to right, while the adjacent group comprising sensor electrodes 802B, which is a transmitter electrode, and the second sensor electrode elements 801A and 805A from the top, which are the receiving electrodes, will create an electric field from right to left. In general, each of the sensor electrode elements (e.g., elements 801A, 802A-802D, 805A) in each sensor electrode array are staggered across a center-line 1221 that is disposed between the sensor electrode elements, as illustrated in sensor electrode array 1210A of FIG. 12A. It should be noted that, in general, the center-line of each staggered sensor electrode 801, 802, and 805 need not be collinear with the other staggered sensor electrodes.

The sensor electrode arrays 1210A-1210D in the sensor array set 1200A are oriented so that the sensor electrodes 801 and 805 in adjacent sensor electrode arrays (e.g., sensor electrode arrays 1210A and 1210B) are oriented in the same direction, while the sensor electrode arrays 1210A-1210D in the sensor array set 1200B are each oriented so that the same sensor electrode elements in adjacent sensor electrodes arrays are positioned adjacent to each other. In some applications it may be desirable to orient sensor electrodes arrays so that the sensor electrodes of the same type, such as sensor electrodes 802 or sensor electrodes 801 and 805 are near to each other, such as shown in FIG. 12B, to reduce the cross-talk between sensor electrodes and their respective traces of the opposite type, such as illustrated in FIG. 12A. In various other embodiments, the sensor electrode pattern in each sensor electrode array may be varied in other ways. For example, instead on a row by row basis, the sensor electrode pattern in each sensor electrode array may be varied every two rows or more. Further, while each column of the sensor electrode pattern is illustrated in FIG. 12A as being similar, in other embodiments, the columns may differ. For example at least one of the columns may be a mirror image of the others, such that one or more of the columns may be flipped along its vertical axis.

The sensor array sets 1200A and 1200B may also include a shield electrode 1270 and trace routing scheme that allows the interconnection of the various traces and external components to be made outside of the sensing region 120, such as in the external regions 1262. The one or more components of the shield electrode 1270 may be coupled together in the external regions 1262, and also connected to a system ground and/or chassis of the input device 100 by a trace 1205.

As described in relation to the embodiment illustrated in FIG. 8, the sensor electrode elements of FIGS. 12A-12B are coupled together such that the top sensor electrode element of each sensor electrode element pair is coupled together and the bottom sensor electrode element of each sensor electrode element pair is coupled together. In other embodiments, the sensor electrode elements may be coupled together in other ways. For example, the bottom sensor electrode element adjacent to a first sensor electrode may be coupled to the top sensor electrode element adjacent to a second sensor electrode, and the bottom sensor electrode element adjacent to the second sensor electrode may be coupled to the top sensor electrode element adjacent to a third sensor electrode, which is similar to the non-staggered configuration illustrated in FIG. 10. Such a coupling pattern may continue throughout the sensor electrode arrays within these staggered or alternating sensor electrode layouts.

Figure 13:
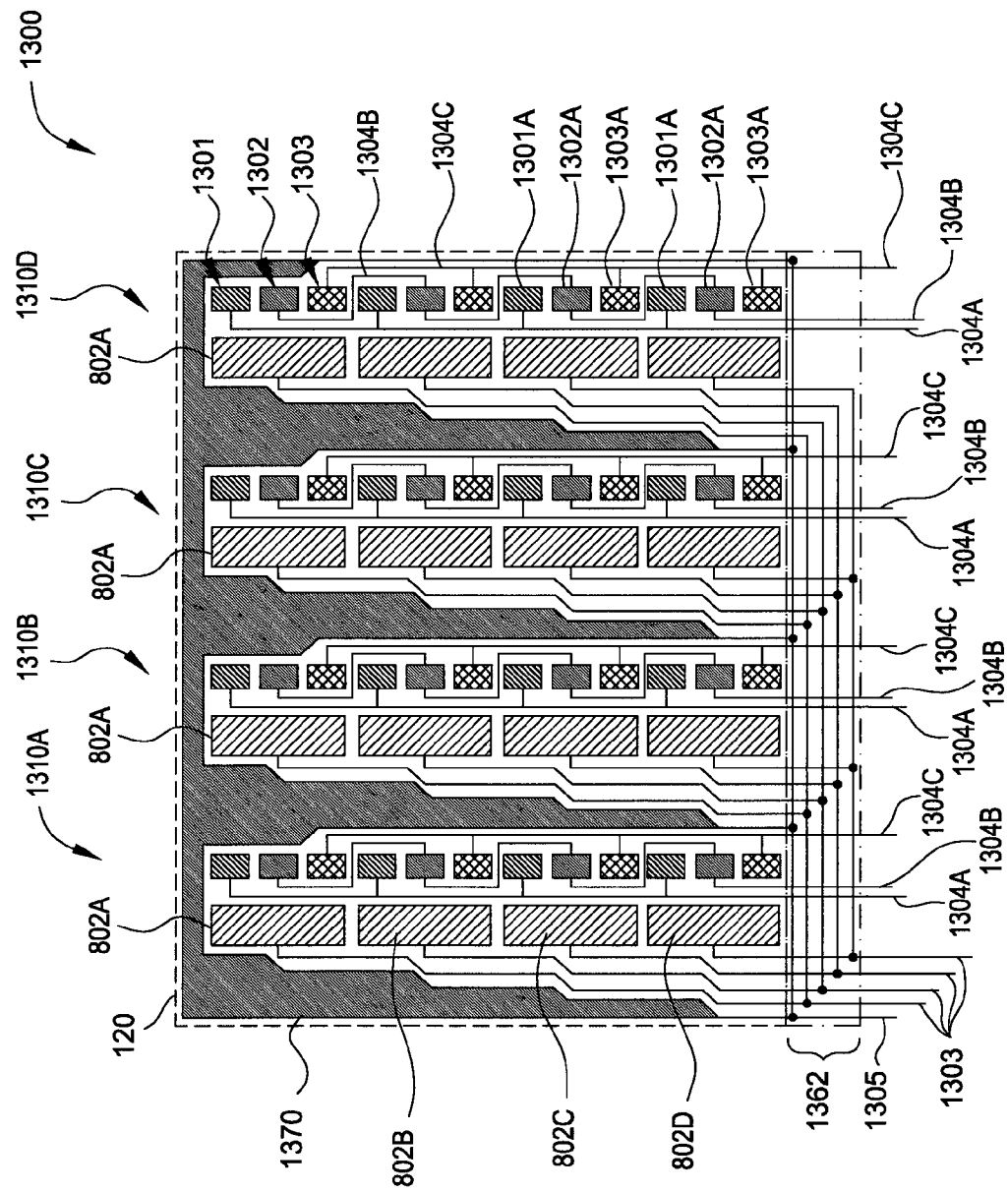
FIG. 13 is a schematic diagram illustrating a sensor electrode set that includes multiple arrays of sensor electrodes that each contain a plurality of sensor electrodes, according to one or more of the embodiments described herein.

FIG. 13 illustrates a sensor array set 1300 that includes arrays of sensor electrodes 1310A-1310D that each comprise a plurality of sensor electrodes that are arranged in groups of four adjacently positioned sensor electrodes elements, such as sensor electrode elements 1301A, 1302A, 1303A found in the sensor electrodes 1301, 1302, 1303 and one of the sensor electrodes 802. In this configuration, each group of sensor electrodes is used to form three sensing elements 121 (not shown in FIG. 13), which, for example may each include sensor elements 802A and 1301A, sensor elements 802A and 1302A and sensor electrode elements 802A and 1303A. In the illustrated embodiment, each of the sensor electrodes 802A-802D in each sensor electrode array are individually coupled to a different trace 803, while sensor electrodes 1301, 1302 and 1303 comprise multiple sensor electrode elements 1301A, 1302A, 1303A that are each coupled together through a common trace 1304A, 1304B and 1304C, respectively. As illustrated, a sensor electrode element 1301A, 1302A, 1303A from each sensor electrode is disposed adjacent a different sensor electrode 802 (e.g., sensor electrodes 802A-802D) within the group. In other embodiments, each sensor electrode element 1301A, 1302A, 1303A may be separately coupled to its own separate trace. In such embodiments, each of the sensor electrode elements may be configured to operate as individual sensor electrodes or as elements of larger sensor electrodes. As described above, in relation to FIG. 2A, sensor electrodes 802A-802D may be configured to transmit transmitter signals and while sensor electrodes 1301, 1302 and 1303 (and related sensor electrode elements) may be configured receive the resulting signals formed from the transmitter signals. Alternately, sensor electrodes 1301, 1302, 1303 may be configured to transmit transmitter signals, while sensor electrodes 802A-802D may be configured to receive the formed resulting signals.

In other variations of the sensor electrode configuration shown in FIG. 13, the sensor electrode elements may be coupled together in other desirable ways. For example, the bottom sensor electrode element adjacent to sensor electrode 802A may be coupled to the top sensor electrode element adjacent to sensor electrode 802B, and the bottom sensor electrode element adjacent to sensor electrode 802B may be coupled to the top sensor electrode element adjacent to sensor electrode 802C, such a coupling pattern may continue throughout the sensor electrode pattern or it may be varied through the sensor electrode pattern. Further, while each column of the sensor electrode pattern is illustrated in FIG. 13 as being similar, in other embodiments, the sensor electrode configuration in two or more columns may differ. For example at least one pair of adjacent sensor electrode arrays may be a mirror image of the others, such that one or more of the columns may be flipped along its vertical axis relative to the other sensor electrode array.

The sensor array set 1300 may also include a shield electrode 1370 and trace routing scheme that allows the interconnection of the various traces and external components to be made outside of the sensing region 120, such as in the external regions 1362. The one or more components of the shield electrode 1370 may be coupled together in the external regions 1362, and also connected to a system ground and/or chassis of the input device 100 by a trace 1305.

Figure 14:
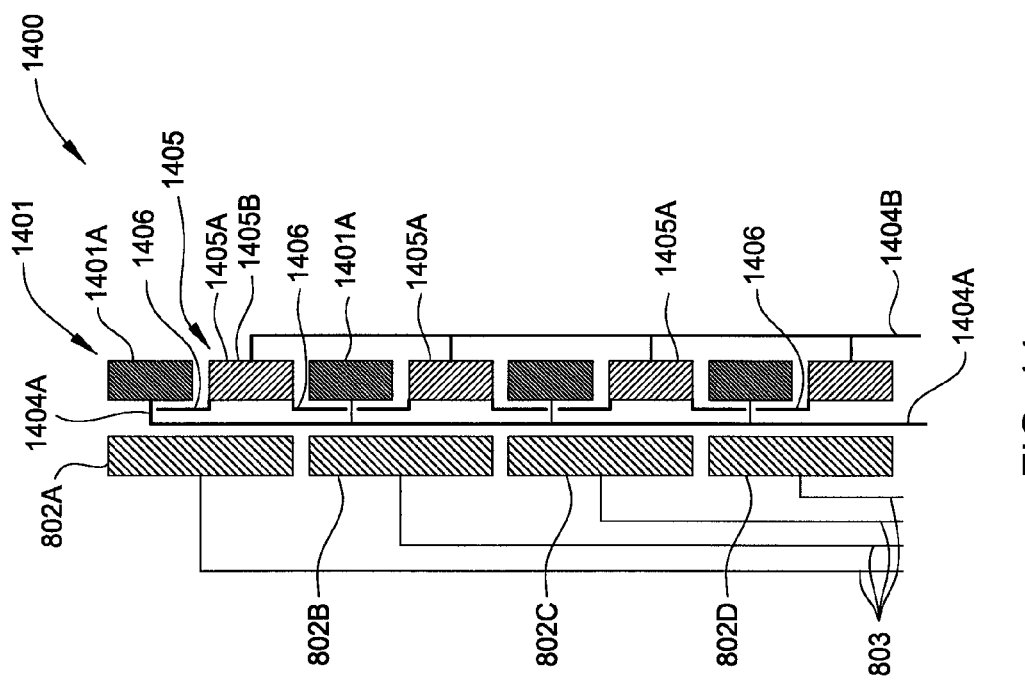
FIG. 14 is a schematic diagram illustrating a plurality of sensor electrodes that are positioned to form an array of sensor electrodes, according to one or more of the embodiments described herein.

In one embodiment, as illustrated in FIG. 14, a sensor electrode array 1400 may comprise features that provide a more uniform signal response between the sensor electrodes in the sensor electrode array. FIG. 14 illustrates a sensor electrode set 1400 that includes an array of sensor electrodes that comprises a plurality of sensor electrodes that are each arranged in groups of three adjacently positioned sensor electrodes elements, such as sensor electrode elements 1401A and 1405A found in the sensor electrodes 1401, 1405, respectively, and one of the sensor electrodes 802 (e.g., sensor electrodes 802A-802D). In this configuration, each group of sensor electrodes is used to form two sensing elements 121 (not shown in FIG. 14), as similarly discussed above. In the illustrated embodiment, each of the sensor electrodes 802A-802D in the sensor electrode array is individually coupled to a different trace 803, while sensor electrodes 1401 and 1405 comprise multiple sensor electrode elements 1401A, 1405A that are each coupled together through a common trace 1404A and 1404B, respectively. As described above, in relation to FIG. 2A, sensor electrodes 802A-802D may be configured to transmit transmitter signals and while sensor electrodes 1401, 1405 (and related sensor electrode elements) may be configured receive the resulting signals formed from the transmitter signals, or vice versa.

In one embodiment, each of the sensor electrode elements 1405A each include conductive protrusions 1406 that are attached to and extend from the body portion 1405B of the sensor electrode element 1405A. In this configuration, the conductive protrusions 1406 may be oriented and positioned so that they even out the difference in the resulting signal received by the sensor electrode 1405 versus the sensor electrode 1401, due to the positioning of an unconnected trace 1404A or other similar element that is disposed between the sensor electrode elements 1405A and the sensor electrodes 802A-802D. Therefore, in some configurations, one or more of the conductive protrusion 1406 may extend in one or more directions from the body portion 1405B of the sensor electrode element 1405A to a position near the sensor electrode element 1401A, such as between the adjacently positioned sensor electrode element 1401A and a portion of its trace 1404A. In one configuration, the conductive protrusions 1406 are positioned substantially parallel to the trace 1404A and/or extend from one or more regions of the body portion 1405B of the sensor electrode element 1405A. The conductive protrusions 1406 may be similar in size to the trace 1404A and comprise the same material as the material used to form each sensor electrode element 1405A (e.g., layer of ITO), and thus may be formed during the patterning process used to form the sensor electrode elements. The conductive protrusions 1406 may alternately comprise a bonded wire or other similar conductive material.

Figure 15:
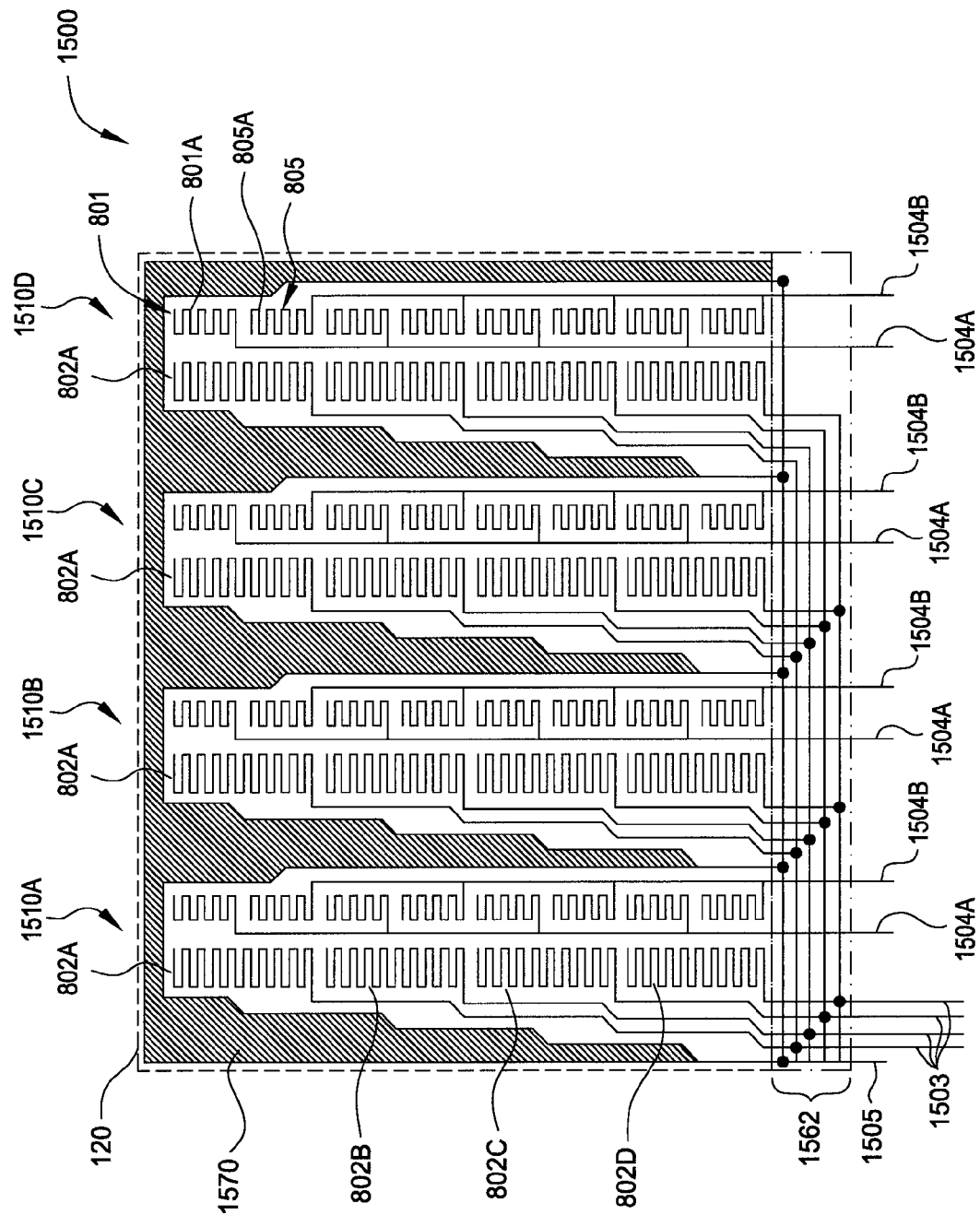
FIG. 15 is a schematic diagram illustrating a sensor electrode set that includes multiple arrays of sensor electrodes that each contain a plurality of sensor electrodes, according to one or more of the embodiments described herein.

FIG. 15 illustrates an alternate embodiment of a single layer sensor array set 1500 that includes multiple sensor electrode arrays 1510A-1510D that comprise sensor electrodes that have a distributed electrode shape, such as the sensor electrodes illustrated and discussed in conjunction with FIG. 4C above. In this configuration, each group of sensor electrodes is used to form two sensing elements 121 (not shown in FIG. 13), which, for example, may include sensor elements 802A and 801A and sensor elements 802A and 805A. In the illustrated embodiment, each of the sensor electrodes 802A-802D in each sensor electrode array are individually coupled to a different trace 1503, while sensor electrodes 801 and 805 comprise multiple sensor electrode elements 801A, 805A that are each coupled together through a common trace 1504A and 1504B, respectively. In various embodiments, the sensor electrodes 801, 802A-802D and 805, which are illustrated in FIG. 15, may comprise the same materials as the traces 1503, 1504A and 1504B and/or may have a similar cross-sectional size in its zig-zag wire shape. In various embodiments, the sensor electrodes may be disposed in various other shapes and designs, versus a zig-zag type pattern as shown. The sensor electrode structure illustrated in the embodiment of FIG. 15 may be combined with any other embodiment described here within.

The sensor array set 1500 may also include a shield electrode 1570 and trace routing scheme that allows the interconnection of the various traces and external components to be made outside of the sensing region 120, such as in the external regions 1562. Portions of the shield electrode 1570 can be coupled together in the external region 1562 and attached to ground trace 1505 that may coupled to an external ground or a chassis of the input device 100.

FIG. 16A illustrates an alternate embodiment of a single layer sensor array set 1600 that includes multiple sensor electrode arrays 1610A-1610D that comprise sensor electrodes that have a distributed electrode shape similar to the configuration illustrate in FIGS. 4C and 15 above. FIG. 16B is a close-up view of a group of sensor electrodes found in one of the sensor electrode arrays 1610A-1610D in the sensor array set 1600. In this illustrated configuration, each group of sensor electrodes is used to form two sensing elements 121 (FIG. 16B), which, for example, may include sensor elements 802A and 801A and sensor elements 802A and 805A. The sensor electrode elements 801A and 805A are found within the sensor electrodes 801 and 805, which are each coupled together through a common trace 1604A and 1604B, respectively. Each of the sensor electrodes 802A-802D in each sensor electrode array are individually coupled to a different trace 1603 and include a distributed electrode shape that may have two or more electrode regions 1630 and 1631 (FIG. 16B) that have a different electrode shape or pattern to compensate for some physical or electrical attribute of the sensor electrodes in a sensor electrode group.

In one embodiment, as shown, the area density of the electrode material in a first electrode region 1630 of a sensor electrode 802 is different than the area density of the electrode material in a second electrode region 1631 of the same sensor electrode 802. In this configuration, the area density of the of the sensor electrode 802 has been adjusted in the first electrode region 1631 versus the second electrode region 1632 to compensate for the additional electrode surface area provided by the connection element 1608 of the trace 1604A that is coupled to the sensor electrode element 801A versus the similarly positioned sensor electrode element 805A. In this way, the higher density second electrode region 1631 will have an improved capacitive coupling to the adjacent sensor electrode element 805A to compensate for the improved capacitive coupling of the sensor electrode element 801A provided by the added sensor electrode area provided by the connection element 1608. The area density of the sensor electrode is generally a measure of the amount of surface area of the electrode per unit area of the surface on which the sensor electrode is disposed. The area density will generally vary between a value of about one for a solid sensor electrode and some amount greater than zero (e.g., 1≈area density (AD)>0). One will note that it is assumed that the area created by the sensor electrode layer thickness times the linear length of the exposed sensor electrode layer thickness is negligible compared to the surface area of the sensor electrode that is parallel to the surface on which the sensor electrode is disposed (i.e., otherwise AD can be greater than 1). Thus, the density of the sensor electrode may be varied to provide an increased uniform response between one or more of the sensor electrodes. While sensor electrodes 802 are illustrated as having regions of differing area density, in other embodiments, one or more of the other sensor electrodes (e.g., sensor electrodes 801 and/or 805) may have a varying area density. Further, such methods may be applied to any sensor electrode patterns described herein.

In various embodiments, the sensor electrodes 801, 802A-802D and 805, which are illustrated in FIG. 16A, may comprised of the same materials as the traces 1603, 1604A and 1604B. In various embodiments, the sensor electrodes may be disposed in various other shapes and designs, versus a zig-zag type pattern as shown. The sensor electrode structure illustrated in the embodiment of FIG. 16A may be combined with any other embodiment described here within.

The sensor array set 1600 may also include a shield electrode 1670 and trace routing scheme that allows the interconnection of the various traces and external components to be made outside of the sensing region 120, such as in the external regions 1662. The portions of the shield electrode 1670 that are disposed between the sensor electrodes and their associated traces can help reduce the crosstalk between sensor electrodes.

FIG. 17A illustrates an alternate embodiment of a single layer sensor electrode set 1700 that includes multiple sensor electrode arrays 1710A-1710D that comprise a plurality of sensor electrode groups that have an angled orientation, or herringbone orientation, relative to each other. Each group of sensor electrodes may be used to form one or more sensing elements 121 (not shown), which may be formed by sensor electrode elements 802A and 801A or a sensing electrode elements 802A and 805A. FIG. 17B is an enlarged view of a group of sensor electrodes that may found in the sensor electrode arrays 1710D. The angled orientation of the sensor electrode elements relative to the edges 1751 of the sensing region 120 can help maximize the sensor electrode edge length between adjacent opposing transcapacitive sensing sensor electrode types. One skilled in the art will appreciate that the capacitive coupling between adjacent sensor electrodes, such as edge 1731 (FIG. 17B) of sensor electrode 802A and the edge 1732 (FIG. 17B) of sensor electrode 801, or the edge 1731 (FIG. 17B) of sensor electrode 802A and the edge 1733 (FIG. 17B) of sensor electrode 805, is primarily created by the electric fields formed at or near these edges due to the proximity of the opposing electrodes. Typically, the surface area of a sensor electrode has a much smaller effect on the capacitive coupling between the electrodes. Therefore, by aligning the edges of the sensor electrode elements at an angle 1725 (FIG. 17B) relative to an edge 1751 (e.g., a vertical edge 1751) of the sensing region 120, the lengths 1722-1724 of the edges 1732-1734 can be increased over a sensor electrode configuration that has their adjacently positioned edges aligned with an edge of the sensing region 120 (e.g., illustrated in FIGS. 10, 12, etc.). In some configurations, the edges 1732, 1733 and/or 1734 formed between adjacently positioned sensor electrode elements 801A, 802A and/or 805A is non-linear (not shown) to increase the adjacent or overlapping length of the sensor electrode edges. In the case the edge(s) are non-linear, the angular alignment of the group of sensor electrodes may be found by comparing the orientation of the major axis of symmetry of the dominant sized electrode(s) found in each group of sensor electrodes or the axis of symmetry of each group of sensor electrodes In one example, a first group of sensor electrode elements and a second group of sensor electrode elements are aligned at an angle less than or greater than 180 degrees. In one example, the first group comprises a first sensor electrode element 801A and a second sensor electrode element 805A that are disposed adjacent to an edge 1732 of a sensor electrode element 802A and a second group of sensor electrode elements that comprise a first sensor electrode element 801A and a second sensor electrode element 805A that are disposed adjacent to an edge 1732 of a sensor electrode element 802B, wherein the edges 1732 in the first and second groups are oriented at an angle less than or greater than 180 degrees. In this example, the angle between the edges 1732 of sensor electrode elements 802A and 802B may be aligned at an angle that is less than or greater than 180 degrees, wherein the angle may be defined as being equal to 180 minus twice the angle 1725 illustrated in FIG. 17B. In one example, the angle between the edges 1732 of sensor electrode elements 802A and 802B is equal to about 90 degrees. In another example, the sensor electrodes (e.g., 801, 802, 805) are oriented at an angle of 180 degrees such that the sensing elements 11 are distributed laterally for a single transmitter, but perpendicular to the direction of distribution of the transmitter electrodes. Furthermore, multiple sensor designs may be combined such that, for example, the substantially enclosing and alternating electrodes of FIG. 4A are combined with the multiple receivers of FIG. 3C and the alternating angled orientations of FIG. 17 to create an electrode element design.

While the sensor electrodes and sensor electrode elements disclosed herein may be illustrated as having specific shapes and sizes, these specific illustrations are not intended to be limiting. In various embodiments, the sensor electrodes and sensor electrode elements may have any other shape that is able to provide the necessary capacitive coupling and response. For example, some differing sensor electrode shapes that may be used singly or in pairs of opposing types of sensor electrodes are shown in FIGS. 4A-4K, 5A-5C, 8, 15 and 16A, and thus one skilled in the art will appreciate that any electrode shape illustrated herein could be used in conjunction with any other electrode shape disclosed herein without deviating from the basic scope of the invention. Further, the sensor electrodes and sensor electrode elements may have differing shapes within the same sensor electrode array. In yet other embodiments, the sensor electrodes and sensor electrodes elements may be any size, such that they provide the necessary capacitive coupling and response. Further, the size of the sensor electrodes and sensor electrode elements may be varied within a sensor electrode array. In yet other embodiments, the shape and size may be varied.

While the sensor electrode sets illustrated in FIGS. 6B, 7, 9A-B, 10, 12A-B, 13, 14 and 16A all illustrate an interconnection scheme in the external region(s) 661, 662, 762, 962, 1062, 1262, 1362, 1562 and 1662 that connects similarly positioned sensor electrodes together, such as the connection of the sensor electrodes positioned in the same row, this configuration is not intended to be limiting since other interconnection schemes can be used. One will note that the input device containing a sensor electrode set may be operated such that a one or more of the transmitter electrodes in the sensor electrode set may transmit at one time, while the receiver type sensor electrodes, may be operated singly or multiply to acquire resulting signals created from the transmitter signal to determine measurements of the capacitive couplings at the capacitive pixels, which are used to determine whether an input object is present and its positional information, as discussed above.

The embodiments and examples set forth herein were presented in order to best explain the present technology and its particular application and to thereby enable those skilled in the art to make and use the present technology. Those skilled in the art will recognize that the foregoing description and examples have been presented for the purposes of illustration and example only. The description as set forth is not intended to be exhaustive or to limit the present technology to the precise form disclosed. While the foregoing is directed to embodiments of the present invention, other and further embodiments of the invention may be devised without departing from the basic scope thereof, and the scope thereof is determined by the claims that follow.

The invention claimed is:

1. A capacitive image sensor, comprising:
a plurality of sensor electrodes that are disposed within a sensing region, wherein the sensing region includes a plurality of unit cells of a sensing pattern, and wherein a subset of the plurality of sensor electrodes comprises:
a first sensor electrode disposed on a first surface of a substrate, the first sensor electrode having a first dimension and a second dimension substantially perpendicular to the first dimension, the first dimension being greater than the second dimension, wherein the first sensor electrode includes a plurality of fingers protruding in the second dimension, and wherein the plurality of fingers are connected by a plurality of connecting segments, the plurality of connecting segments being continuous, angled, and alternating in angle in a lengthwise direction along the first dimension, and wherein adjacent subsets of the plurality of fingers, protruding from adjacent alternating connecting segments, protrude in opposite directions in the second dimension; and
two or more sensor electrodes of the subset of the plurality of sensor electrodes, the two or more sensor electrodes disposed adjacent to the first sensor electrode and on the first surface of the substrate, each of the two or more sensor electrodes being interdigitated with a different one of the subsets of the plurality of fingers in the alternating directions in the second dimension of the first sensor electrode, wherein, within the sensing region, no jumper is coupled to any of the plurality of sensor electrodes, and wherein the first sensor electrode encloses the two or more sensor electrodes in the second dimension and substantially encloses the two or more sensor electrodes in the first dimension.

2. The capacitive imaging sensor of claim 1, wherein each of the two or more sensor electrodes being are interdigitated with one of the subsets of the plurality of fingers such that each of the two or more sensor electrodes overlaps the first sensor electrode in the second dimension.

3. The capacitive imaging sensor of claim 1, wherein the first sensor electrode is wider than each of the two or more sensor electrodes.

4. The capacitive imaging sensor of claim 1, wherein the two or more sensor electrodes are disposed adjacent to one another along the first dimension.

5. The capacitive imaging sensor of claim 1, wherein each of the two or more sensor electrodes has recess regions in which the interdigitation occurs.

6. The capacitive imaging sensor of claim 1, wherein the two or more sensor electrodes comprise receiver electrodes and the first sensor electrode comprises a transmitter electrode.

7. The capacitive image sensor of claim 1, wherein at least first and second routing traces for the two or more sensor electrodes and a third routing trace for the first sensor electrode are each connected from a first end of the capacitive image sensor in the first dimension.

8. A capacitive image sensor, comprising:
an array of sensing patterns, each sensing pattern comprising:
a first sensor electrode disposed on a first surface of a substrate, the first sensor electrode having a first dimension that is substantially perpendicular to, and greater than, a second dimension, the first sensor electrode having a plurality of fingers protruding in the second dimension, wherein the plurality of fingers are connected by a plurality of connecting segments, the plurality of connecting segments being continuous, angled, and alternating in angle in a lengthwise direction along the first dimension, and wherein adjacent subsets of the plurality of fingers, protruding from adjacent alternating connecting segments, protrude in opposite directions in the second dimension;
two or more sensor electrodes disposed adjacent to the first sensor electrode on the first surface of the substrate, each of the two or more sensor electrodes having a second plurality of fingers that are interdigitated with a different one of the subsets of the plurality of fingers in the alternating directions in the second dimension,
wherein the first sensor electrode encloses the two or more sensor electrodes in the second dimension and substantially encloses the two or more sensor electrodes in the first dimension; and
wherein the first sensor electrode and the two or more sensor electrodes are independently routed.

9. The capacitive image sensor of claim 8, wherein the first plurality of fingers and the two or more sensor electrodes are interdigitated in an overlap area that is longer in the second dimension than in the first dimension.

10. The capacitive image sensor of claim 8, wherein the two or more sensor electrodes are disposed adjacent along the first dimension.

11. The capacitive image sensor of claim 8, wherein:
the first sensor electrode is wider than each of the two or more sensor electrodes.

12. The capacitive image sensor of claim 8, wherein the first sensor electrode comprises a transmitter electrode and the two or more sensor electrodes comprise receiver electrodes.

13. The capacitive image sensor of claim 8, wherein a first routing trace for the first sensor electrode and at least second and third routing traces for the two or more sensor electrodes are each connected from a first end of the capacitive image sensor in the first dimension.

14. A processing system, comprising:
a signal generating processor configured to drive one or more of a first sensor electrode, a second sensor electrode, and a third sensor electrode with a signal for capacitive sensing; and
a sensor processor configured to receive resulting signals with one or more of the first sensor electrode, the second sensor electrode, and the third sensor electrode, the resulting signals comprising effects related to the signal, wherein the first sensor electrode is disposed on a first surface of a substrate of a capacitive image sensor, the first sensor electrode having a first dimension that is substantially perpendicular to, and greater than, a second dimension, the first sensor electrode having a first plurality of fingers, wherein the plurality of fingers are connected by a plurality of connecting segments, the plurality of connecting segments being continuous, angled, and alternating in angle in a lengthwise direction along the first dimension, wherein adjacent subsets of the plurality of fingers, protruding from adjacent alternating connecting segments, protrude in opposite directions in the second dimension, wherein the second sensor electrode is disposed on the first surface of the substrate, the second sensor electrode being interdigitated with a first subset of the plurality of fingers in a first direction in the second dimension, wherein the third sensor electrode is disposed on the first surface of the substrate, the third sensor electrode being interdigitated with a different subset the plurality of fingers in a second an opposite direction in the second dimension, wherein the first sensor electrode encloses the second and third sensor electrodes in the second dimension and substantially encloses the second and third sensor electrodes in the first dimension, and wherein the first sensor electrode, the second sensor electrode, and the third sensor electrode are independently routed.

15. The processing system of claim 14, wherein the first sensor electrode is wider than each of the second sensor electrode and the third sensor electrode.

16. The processing system of claim 14, wherein a first routing trace for the first sensor electrode, a second routing trace for the second sensor electrode, and a third routing trace for the third sensor electrode are each connected from a first end of the capacitive image sensor in the first dimension.

* * * * *

UNITED STATES PATENT AND TRADEMARK OFFICE
CERTIFICATE OF CORRECTION

PATENT NO. : 9,817,533 B2
APPLICATION NO. : 14/918496
DATED : November 14, 2017
INVENTOR(S) : Mihai M. Bulea et al.

Page 1 of 1

It is certified that error appears in the above-identified patent and that said Letters Patent is hereby corrected as shown below:

In the Claims

Column 37, Line 55 In Claim 2, after "electrodes" please delete "being".

Column 38, Line 30 In Claim 8, before "plurality" please delete "second".

Column 38, Line 40 In Claim 9, before "plurality" please delete "first".

Column 39, Line 5 In Claim 14, after "the first sensor electrode having a" please delete "first".

Signed and Sealed this
First Day of May, 2018

Andrei Iancu
*Director of the United States Patent and Trademark Office*